United States Patent
Suzuki et al.

(10) Patent No.: US 9,873,307 B2
(45) Date of Patent: Jan. 23, 2018

(54) VEHICULAR AIR CONDITIONER

(71) Applicant: Sanden Holdings Corporation, Isesaki-shi, Gunma (JP)

(72) Inventors: Kenichi Suzuki, Isesaki (JP); Ryo Miyakoshi, Isesaki (JP); Megumi Shigeta, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 49 days.

(21) Appl. No.: 15/022,103

(22) PCT Filed: Sep. 16, 2014

(86) PCT No.: PCT/JP2014/074416
§ 371 (c)(1),
(2) Date: Mar. 15, 2016

(87) PCT Pub. No.: WO2015/041209
PCT Pub. Date: Mar. 26, 2015

(65) Prior Publication Data
US 2016/0236538 A1 Aug. 18, 2016

(30) Foreign Application Priority Data
Sep. 18, 2013 (JP) .................................. 2013-192851

(51) Int. Cl.
*B60H 1/00* (2006.01)
*F25B 5/04* (2006.01)
(Continued)

(52) U.S. Cl.
CPC ..... *B60H 1/00921* (2013.01); *B60H 1/00385* (2013.01); *B60H 1/00678* (2013.01);
(Continued)

(58) Field of Classification Search
CPC ................ B60H 1/00678; B60H 1/024; B60H 1/00921; B60H 1/00035; B60H 1/3204;
(Continued)

(56) References Cited

U.S. PATENT DOCUMENTS 6,237,352 B1 * 5/2001 Goodchild ........... B01D 5/0039
62/196.4
9,671,119 B2 * 6/2017 Yamashita ............. F24F 11/001
(Continued)

FOREIGN PATENT DOCUMENTS

JP 2001-324237 A 11/2001
JP 3985384 B2 10/2007
(Continued)

OTHER PUBLICATIONS

The State Intellectual Property Office of People'S Republic of China, First Office Action for Chinese Application No. 201480051320.8, dated Feb. 15, 2017.
(Continued)

*Primary Examiner* — Ljiljana Ciric
(74) *Attorney, Agent, or Firm* — Baker Botts L.L.P.

(57) ABSTRACT

A vehicular air conditioner includes a dehumidifying and cooling mode, in which a heating capability of a radiator can be acquired without increasing a flow rate of a refrigerant into a heat absorber. The dehumidifying and cooling mode lets the refrigerant discharged from a compressor (2) radiate heat in a radiator (4) and an outdoor heat exchanger (7), decompress the refrigerant by which heat has been radiated, and then let the refrigerant absorb heat in a heat absorber (9). The vehicular air conditioner includes an injection circuit (40) which distributes a part of the refrigerant flowing out from the radiator (4) to return the part of the refrigerant to the compressor (2). In the dehumidifying and cooling mode, the injection circuit (40) is operated to return the refrigerant
(Continued)

to the compressor (2) when there is a predetermined radiator capability shortage condition and/or predetermined low outdoor air temperature startup condition.

19 Claims, 12 Drawing Sheets

(51) Int. Cl.
*F25B 6/04* (2006.01)
*F25B 49/02* (2006.01)
*B60H 3/02* (2006.01)
*F25B 40/02* (2006.01)
*F25B 41/04* (2006.01)
*F25B 43/00* (2006.01)
*F25B 40/00* (2006.01)

(52) U.S. Cl.
CPC .............. *B60H 3/024* (2013.01); *F25B 5/04* (2013.01); *F25B 6/04* (2013.01); *F25B 40/02* (2013.01); *F25B 41/04* (2013.01); *F25B 43/006* (2013.01); *F25B 49/02* (2013.01); *F25B 49/022* (2013.01); *B60H 2001/00957* (2013.01); *F25B 40/00* (2013.01); *F25B 2400/0409* (2013.01); *F25B 2400/0411* (2013.01); *F25B 2400/0417* (2013.01); *F25B 2600/0253* (2013.01); *F25B 2600/2509* (2013.01); *F25B 2700/2106* (2013.01); *F25B 2700/2117* (2013.01)

(58) Field of Classification Search
CPC ............ B60H 1/3207; F25B 5/04; F25B 6/04; F25B 40/02; F25B 41/04; F25B 43/006; F25B 49/02; F25B 49/022
USPC .......................................................... 62/160
See application file for complete search history.

(56) References Cited

U.S. PATENT DOCUMENTS

| | | | | |
|---|---|---|---|---|
| 2002/0157409 A1* | 10/2002 | Pham | .................... | F04C 27/005 62/228.3 |
| 2005/0120733 A1* | 6/2005 | Healy | ...................... | F25B 1/04 62/324.4 |
| 2011/0016896 A1* | 1/2011 | Oomura | ............. | B60H 1/00785 62/155 |
| 2012/0125024 A1* | 5/2012 | Ryu | ........................ | F25B 40/02 62/115 |
| 2012/0255319 A1* | 10/2012 | Itoh | ....................... | F24F 3/1405 62/160 |
| 2013/0233008 A1* | 9/2013 | Yamashita | ................ | F25B 1/10 62/196.1 |
| 2013/0306302 A1* | 11/2013 | Osaka | ................ | B60H 1/00642 165/287 |
| 2014/0053587 A1* | 2/2014 | Arii | ....................... | F25B 41/043 62/196.1 |
| 2014/0069123 A1* | 3/2014 | Kim | ........................ | F25B 5/04 62/61 |
| 2014/0137588 A1* | 5/2014 | Takeichi | ................. | F25B 13/00 62/228.1 |
| 2015/0151609 A1* | 6/2015 | Satou | .................... | B60H 1/3204 165/63 |
| 2015/0153078 A1* | 6/2015 | Lee | .......................... | F25B 30/02 62/324.6 |
| 2015/0247661 A1* | 9/2015 | Ishimura | ................. | F25B 13/00 62/225 |
| 2015/0283872 A1* | 10/2015 | Miyakoshi | ........... | B60H 1/3204 62/160 |
| 2015/0283978 A1* | 10/2015 | Miyakoshi | ............ | F25B 47/022 62/140 |
| 2015/0298525 A1* | 10/2015 | Miyakoshi | ............ | F25B 49/005 62/160 |
| 2015/0298526 A1* | 10/2015 | Miyakoshi | ......... | B60H 1/00921 62/160 |
| 2015/0300714 A1* | 10/2015 | Ishimura | ................. | F25B 13/00 62/225 |
| 2015/0306939 A1* | 10/2015 | Miyakoshi | ......... | B60H 1/00921 62/160 |
| 2015/0314668 A1* | 11/2015 | Suzuki | ...................... | F25B 1/10 62/160 |
| 2016/0084554 A1* | 3/2016 | Suzuki | .................... | F25B 13/00 62/160 |
| 2016/0084555 A1* | 3/2016 | Suzuki | .................... | F25B 47/02 62/151 |
| 2016/0185185 A1* | 6/2016 | Suzuki | ............... | B60H 1/00921 237/5 |
| 2016/0185186 A1* | 6/2016 | Miyakoshi | ......... | B60H 1/00385 62/160 |
| 2016/0193896 A1* | 7/2016 | Miyakoshi | ......... | B60H 1/00385 62/155 |
| 2016/0201959 A1* | 7/2016 | Miyakoshi | ............... | B60H 1/32 62/155 |
| 2016/0201960 A1* | 7/2016 | Miyakoshi | ......... | B60H 1/00385 62/154 |
| 2016/0201961 A1* | 7/2016 | Miyakoshi | ......... | B60H 1/00921 62/133 |
| 2016/0236538 A1* | 8/2016 | Suzuki | ............... | B60H 1/00921 |
| 2016/0236539 A1* | 8/2016 | Suzuki | ............... | B60H 1/00385 |
| 2017/0080778 A1* | 3/2017 | Suzuki | ..................... | F25B 1/00 |

FOREIGN PATENT DOCUMENTS

| | | |
|---|---|---|
| JP | 2011-111140 A | 6/2011 |
| JP | 2012-176660 A | 9/2012 |
| JP | 2013-086606 A | 5/2013 |
| JP | 2013-095347 A | 5/2013 |
| WO | 2012/118198 A1 | 9/2012 |
| WO | 2013/121844 A1 | 8/2013 |

OTHER PUBLICATIONS

Japan Patent Office, Notification of Reasons for Refusal for Japanese Patent Application No. 2013-192851, dated Aug. 22, 2017.

* cited by examiner

P-h DIAGRAM

VEHICULAR AIR CONDITIONER

CROSS-REFERENCE TO RELATED APPLICATIONS

This application is a U.S. National Stage Patent Application under 37 U.S.C. §371 of International Patent Application No. PCT/JP2014/074416, filed on Sep. 16, 2014, which claims the benefit of Japanese Patent Application No. JP 2013-192851, filed on Sep. 18, 2013, the disclosures of which are incorporated herein by reference in their entirety.

TECHNICAL FIELD

The present invention relates to a vehicular air conditioner of a heat pump system which conditions air in a vehicle interior.

BACKGROUND ART

Due to actualization of environmental problems in recent years, hybrid cars and electric cars have spread. Furthermore, as an air conditioner which is applicable to such a vehicle, there has been developed an air conditioner which includes a compressor to compress and discharge a refrigerant, a radiator (a condenser) disposed in a vehicle interior to let the refrigerant radiate heat, a heat absorber (an evaporator) disposed in the vehicle interior to let the refrigerant absorb heat, and a refrigerant circuit constituted of an outdoor heat exchanger or the like disposed outside the vehicle interior to let the refrigerant radiate or absorb heat, and which executes respective modes such as a heating mode in which the refrigerant discharged from the compressor radiates heat in the radiator and the refrigerant by which heat has been radiated in this radiator absorbs heat in the outdoor heat exchanger, a dehumidifying and heating mode in which the refrigerant discharged from the compressor radiates heat in the radiator and the refrigerant by which heat has been radiated in this radiator absorbs heat in the heat absorber and the outdoor heat exchanger (or only in the heat absorber), a cooling mode in which the refrigerant discharged from the compressor radiates heat in the outdoor heat exchanger and absorbs heat in the heat absorber, and a dehumidifying and cooling mode in which the refrigerant discharged from the compressor radiates heat in the radiator and the outdoor heat exchanger (or only in the radiator) and absorbs heat in the heat absorber (e.g., see Patent Document 1).

Additionally, there has been developed an air conditioner including an injection circuit which distributes a refrigerant flowing out from a radiator, decompresses this distributed refrigerant, performs heat exchange between this refrigerant and the refrigerant flowing out from the radiator, and returns the refrigerant to the middle of compression by a compressor in a heating mode, whereby the refrigerant to be discharged from the compressor is increased, and a heating capability of the radiator improves (e.g., see Patent Document 2).

CITATION LIST

Patent Documents

Patent Document 1: Japanese Patent Application Publication No. 2012-176660
Patent Document 2: Japanese Patent No. 3985384

SUMMARY OF THE INVENTION

Problems to be Solved by the Invention

Here, in a case where a dehumidifying and cooling mode is started on condition that an outdoor air temperature is low (e.g., 0° C. to +10° C. or the like), a large heating capability of a radiator (a capability to heat air cooled in a heat absorber again) is required, and a number of revolution of a compressor has to be increased to acquire a flow rate of a refrigerant into the radiator. However, at a low outside air temperature, a temperature of the heat absorber is also easy to drop, and hence when the number of revolution of the compressor is increased, the flow rate of the refrigerant into the heat absorber increases to generate frost in the heat absorber.

Thus, in a case where the compressor is operated and controlled so that the heat absorber is not frosted, an amount of the refrigerant to be circulated decreases, and hence even when a valve position of an outdoor expansion valve to decompress the refrigerant flowing into an outdoor heat exchanger is decreased, a pressure of the radiator does not increase to a target value, thereby causing the problem that the heating capability of the radiator cannot be acquired.

The present invention has been developed to solve such a conventional technical problem, and an object thereof is to provide a vehicular air conditioner in which in a dehumidifying and cooling mode, a heating capability of a radiator can be acquired without increasing a flow rate of a refrigerant into a heat absorber.

Means for Solving the Problems

A vehicular air conditioner of the present invention includes a compressor which compresses a refrigerant, a radiator which lets the refrigerant radiate heat to heat air to be supplied to a vehicle interior, a heat absorber which lets the refrigerant absorb heat to cool the air to be supplied to the vehicle interior, an outdoor heat exchanger disposed outside the vehicle interior to let the refrigerant radiate heat, and control means, and the vehicular air conditioner executes a dehumidifying and cooling mode in which the control means lets the refrigerant discharged from the compressor radiate heat in the radiator and the outdoor heat exchanger or only in the radiator, decompresses the refrigerant by which heat has been radiated and then lets the refrigerant absorb heat in the heat absorber, the vehicular air conditioner including an injection circuit which distributes a part of the refrigerant flowing out from the radiator to return the part of the refrigerant to the compressor, the vehicular air conditioner being characterized in that in the dehumidifying and cooling mode, the control means operates the injection circuit to return the refrigerant to the compressor, when there is established predetermined radiator capability shortage condition on which a heating capability of the radiator runs short and/or predetermined low outdoor air temperature startup condition on which startup is performed at a low outdoor air temperature.

The vehicular air conditioner of the invention of claim 2 is characterized in that in the above invention, after elapse of predetermined time from the startup, the control means judges that the radiator capability shortage condition is established in a case where a difference between a target radiator temperature and a temperature of the radiator increases and/or a difference between a target radiator pressure and a pressure of the radiator increases.

The vehicular air conditioner of the invention of claim 3 is characterized in that in the above invention, the control means stops the operation of the injection circuit when there is established one, any combination or all of a case where the difference between the target radiator temperature and the temperature of the radiator decreases, a case where the difference between the target radiator pressure and the pressure of the radiator decreases, and a case where a difference between a target heat absorber temperature and a temperature of the he absorber decreases.

The vehicular air conditioner of the invention of claim 4 is characterized in that in the invention of claim 1, within. predetermined time from the startup, the control means judges that the low outdoor air temperature startup condition is established in a case where the outdoor air temperature is low and a target outlet temperature to the vehicle interior is high.

The vehicular air conditioner of the invention of claim 5 is characterized in that in the above invention, the control means stops the operation of the injection circuit in a case where the outdoor air temperature rises and the target outlet temperature drops.

The vehicular air conditioner of the invention of claim 6 is characterized in that in the above respective inventions, the vehicular air conditioner includes an outdoor expansion valve which decompresses the refrigerant flowing into the outdoor heat exchanger, and the control means controls a number of revolution of the compressor on the basis of the target heat absorber temperature of the heat absorber, and the control means controls a valve position of the outdoor expansion valve on the basis of the target radiator pressure of the radiator.

The vehicular air conditioner of the invention of claim 7 is characterized in that in the above respective inventions, the injection circuit has an injection expansion valve, and a heat exchanger which performs heat exchange between the refrigerant decompressed by this injection expansion valve and the refrigerant discharged from the compressor before flowing into the radiator or the refrigerant flowing out from this radiator, and the control means controls the valve position of the injection expansion valve on the basis of an injection refrigerant superheat degree of the refrigerant to be returned to the compressor by the injection circuit and a predetermined target injection refrigerant superheat degree.

The vehicular air conditioner of the invention of claim 8 is characterized in that in the above invention, in a case where the radiator capability shortage condition is established, the control means increases the target injection refrigerant superheat degree when the difference between the target radiator temperature and the temperature of the radiator is small and/or when the difference between the target radiator pressure and the pressure of the radiator is small, and the control means decreases the target injection refrigerant superheat degree when the difference between the target radiator temperature and the temperature of the radiator is large and/or when the difference between the target radiator pressure and the pressure of the radiator is large.

The vehicular air conditioner of the invention of claim 9 is characterized in that in the invention of claim 7 or claim 8, the control means controls the valve position of the injection expansion valve on the basis of the injection refrigerant superheat degree and the target injection refrigerant superheat degree in a case where the injection refrigerant superheat degree is low, and the control means controls the valve position of the injection expansion valve on the basis of the target radiator pressure and the pressure of the radiator in a case where the injection refrigerant superheat degree is high.

Advantageous Effect of the Invention

According to the present invention, there is provided a vehicular air conditioner including a compressor which compresses a refrigerant, a radiator which lets the refrigerant radiate heat to heat air to be supplied to a vehicle interior, a heat absorber which lets the refrigerant absorb heat to cool the air to be supplied to the vehicle interior, an outdoor heat exchanger disposed outside the vehicle interior to let the refrigerant radiate heat, and control means, and the vehicular air conditioner executes a dehumidifying and cooling mode in which this control means lets the refrigerant discharged from the compressor radiate heat in the radiator and the outdoor heat exchanger or only in the radiator, decompresses the refrigerant by which heat has been radiated and then lets the refrigerant absorb heat in the heat absorber. The vehicular air conditioner includes an injection circuit which distributes a part of the refrigerant flowing out from the radiator to return the part of the refrigerant to the compressor, and in the dehumidifying and cooling mode, the control means operates the injection circuit to return the refrigerant to the compressor, when there is established predetermined radiator capability shortage condition on which a heating capability of the radiator runs short and/or predetermined low outdoor air temperature startup condition on which startup is performed at a low outdoor air temperature. Therefore, in a case where the heating capability of the radiator runs short or when the startup is performed at the low outdoor air temperature, the injection circuit returns a part of the refrigerant flowing out from the radiator, and a flow rate of the refrigerant into the radiator is increased, so that the heating capability of the radiator can improve. On the other hand, by the distribution of the refrigerant into the injection circuit, the flow rate of the refrigerant into the heat absorber decreases, and hence it is also possible to increase a number of revolution of the compressor. Also in this case, the heating capability of the radiator can be acquired, and frosting of the heat absorber is prevented or inhibited.

Consequently, according to the present invention, in the dehumidifying and cooling mode, temperatures of the radiator and the heat absorber are appropriately controlled, and the heating capability of the radiator is acquired while avoiding the frosting of the heat absorber, so that dehumidifying and cooling can smoothly be achieved.

In this case, as in the invention of claim 2, after elapse of predetermined time from the startup, the control means judges that the radiator capability shortage condition is established in a case where a difference between a target radiator temperature and a temperature of the radiator increases and/or a difference between a target radiator pressure and a pressure of the radiator increases, so that it is possible to precisely judge that the heating capability of the radiator runs short.

Additionally, as in the invention of claim 3, the control means stops the operation of the injection circuit when there is established one, any combination or all of a case where the difference between the target radiator temperature and the temperature of the radiator decreases, a case where the difference between the target radiator pressure and the pressure of the radiator decreases, and a case where a difference between a target heat absorber temperature and a temperature of the heat absorber decreases. Consequently, it is judged that a shortage state of the heating capability of the radiator is resolved, so that the operation of the injection circuit can precisely be stopped.

Additionally, as in the invention of claim 4, within predetermined time from the startup, the control means judges that the low outdoor air temperature startup condition is established in a case where the outdoor air temperature is low and a target outlet temperature to the vehicle interior is high, so that it is possible to precisely judge that the startup is performed at the low outdoor air temperature.

Further, as in the invention of claim 5, the control means stops the operation of the injection circuit in a case where the outdoor air temperature rises and the target outlet temperature drops, so that resolution of low outdoor air temperature environment can precisely be judged to stop the operation of the injection circuit.

Especially, as in the invention of claim 6, the vehicular air conditioner includes an outdoor expansion valve which decompresses the refrigerant flowing into the outdoor heat exchanger, and the control means controls a number of revolution of the compressor on the basis of the target heat absorber temperature of the heat absorber, and the control means controls a valve position of the outdoor expansion valve on the basis of the target radiator pressure of the radiator. In this case, the above invention is remarkably effective.

Additionally, as in the invention of claim 7, the injection circuit has an injection expansion valve, and a heat exchanger which performs heat exchange between the refrigerant decompressed by this injection expansion valve and the refrigerant discharged from the compressor before flowing into the radiator or the refrigerant flowing out from this radiator, and the control means controls the valve position of the injection expansion valve on the basis of an injection refrigerant superheat degree of the refrigerant to be returned to the compressor by the injection circuit and a predetermined target injection refrigerant superheat degree. Consequently, it is possible to precisely perform gas injection into the compressor.

At this time, as in the invention of claim 8, in a case where the radiator capability shortage condition is established, the control means increases the target injection refrigerant superheat degree when the difference between the target radiator temperature and the temperature of the radiator is small and/or when the difference between the target radiator pressure and the pressure of the radiator is small, and the control means decreases the target injection refrigerant superheat degree when the difference between the target radiator temperature and the temperature of the radiator is large and/or when the difference between the target radiator pressure and the pressure of the radiator is large. Consequently, when the heating capability of the radiator is comparatively sufficient, the target injection refrigerant superheat degree is increased to decrease an amount of a gas to be injected into the compressor, and when the heating capability of the radiator runs short, the target injection refrigerant superheat degree is decreased to increase the amount of the gas to be injected into the compressor, so that control can appropriately be executed without any excess or shortage in the gas injection amount.

Furthermore, as in the invention of claim 9, the control means controls the valve position of the injection expansion valve on the basis of the injection refrigerant superheat degree and the target injection refrigerant superheat degree in a case where the injection refrigerant superheat degree is low, and the control means controls the valve position of the injection expansion valve on the basis of the target radiator pressure and the pressure of the radiator in a case where the injection refrigerant superheat degree is high. Consequently, the pressure of the radiator in situations where the gas injection amount is small, i.e., a high pressure can be acquired, and the heating capability of the radiator can be maintained.

MODE FOR CARRYING OUT THE INVENTION

Hereinafter, embodiments of the present invention will be described in detail with reference to the drawings.

Embodiment 1

Figure 1:
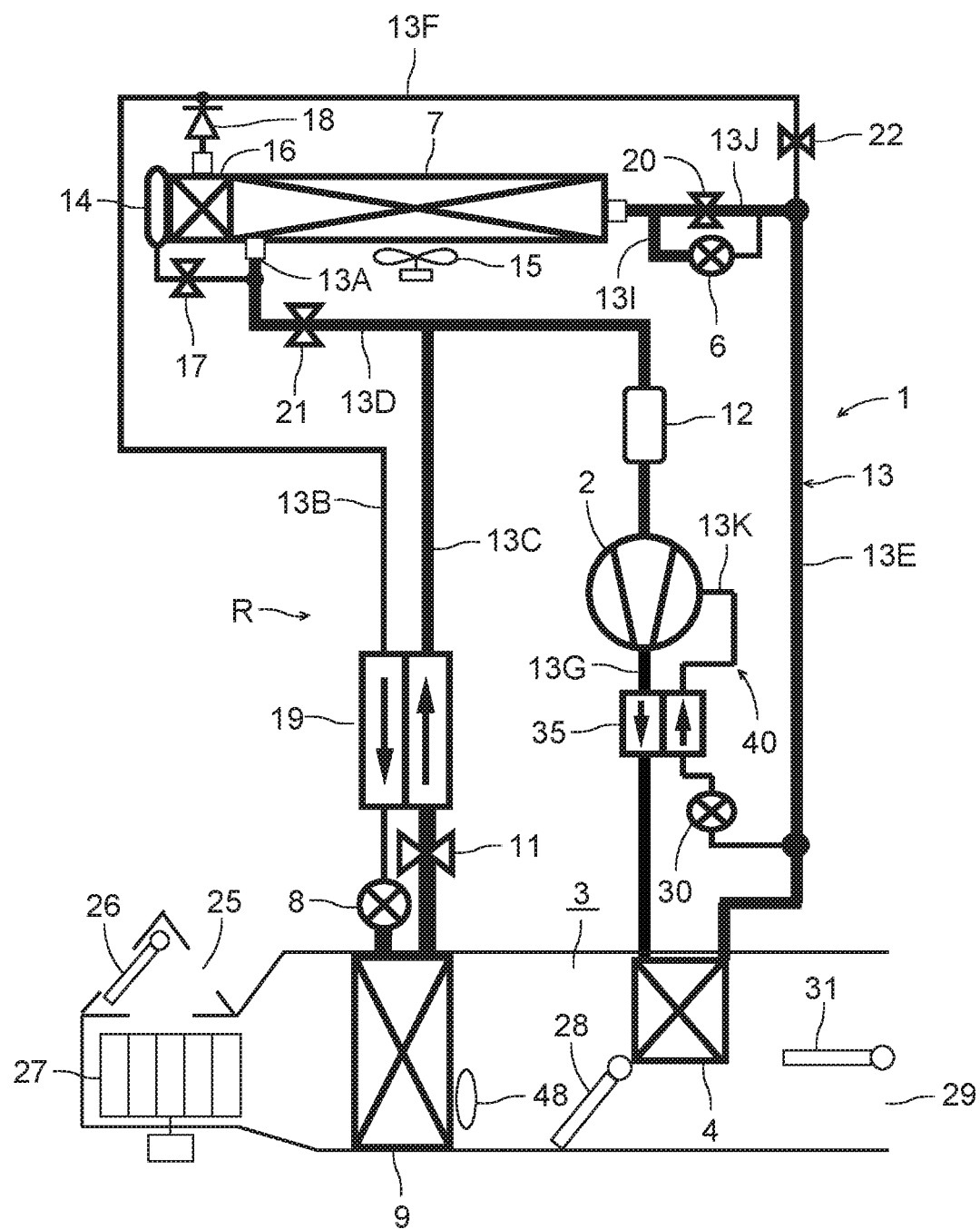
FIG. 1 is a constitutional view of a vehicular air conditioner of one embodiment to which the present invention is applied.

FIG. 1 shows a constitutional view of a vehicular air conditioner 1 of one embodiment of the present invention. In this case, a vehicle of the embodiment to which the present invention is applied is an electric car (EV) which does not have an engine (an internal combustion engine), and runs by driving an electric motor for running by a power charged in a battery (which is not shown), and the vehicular air conditioner 1 of the present invention is also driven by the power of the battery. That is, in the electric car in which heating cannot be performed by waste heat of the engine, the vehicular air conditioner 1 of the embodiment selectively executes respective operation modes of heating, dehumidifying and heating, dehumidifying and cooling, cooling, and the like by a heat pump operation in which a refrigerant circuit is used.

It is to be noted that the vehicle is not limited to the electric car, and the present invention is also effective for a so-called hybrid car in which the engine is used together with the electric motor for the running, and is, needless to say, further applicable also to a usual car which runs by the engine.

The vehicular air conditioner 1 of the embodiment performs air conditioning (heating, cooling, dehumidifying, and ventilation) of a vehicle interior in the electric car, and there are successively connected, by a refrigerant pipe 13, an electric compressor 2 which compresses a refrigerant, a radiator 4 disposed in an air flow passage 3 of an HVAC unit 10 in which vehicle interior air is passed and circulated, to let the high-temperature high-pressure refrigerant discharged from the compressor 2 radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 to let the refrigerant, absorb heat from interior and exterior of the vehicle during the cooling and during the dehumidifying, an evaporation capability control valve 11 which adjusts an evaporation capability in the heat absorber 9, an accumulator 12 and the like, so that a refrigerant circuit R is constituted. It is to be noted that in the outdoor heat exchanger 7, an outdoor blower 15 is disposed which performs the heat exchange between the outdoor air and the refrigerant.

In addition, the outdoor heat exchanger 7 has a receiver drier portion 14 and a subcooling portion 16 successively on a refrigerant downstream side, a refrigerant pipe 13A extended out from the outdoor heat exchanger 7 is connected to the receiver drier portion 14 via a solenoid valve an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during the heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, a bypass pipe 13J is connected to the outdoor expansion valve 6 in parallel with the outdoor expansion valve, and in the bypass pipe 13J, there is disposed a solenoid valve (an opening/closing valve) 20 which is opened in a cooling mode and bypasses the outdoor expansion valve 6 to pass the refrigerant.

Additionally, the refrigerant pipe 13E immediately extended out from the radiator 4 (before the pipe is branched into the refrigerant pipe 13F and a refrigerant pipe 13I) is branched, and this branched refrigerant pipe 13K communicates to be connected to the middle of compression by the compressor 2 via an injection expansion valve 30 constituted of an electric valve for injection control. Further, the refrigerant pipe 13K between an outlet side of the injection expansion valve 30 and the compressor 2 is disposed in a heat exchange relation with a refrigerant pipe 13G positioned on a discharge side of the compressor 2, and both the pipes constitute a discharge side heat exchanger (a heat exchanger) 35.

The refrigerant pipe 13K, the injection expansion valve 30 and the discharge side heat exchanger 35 constitute an injection circuit 40. The injection circuit 40 is a circuit which distributes a part of the refrigerant flowing out from the radiator 4 to return the part of the refrigerant to the middle of the compression by the compressor 2 (performs gas injection), and in a case where the injection circuit 40 operates, the injection expansion valve 30 opens, and a part of the refrigerant flowing out from the radiator 4 is distributed to the refrigerant, pipe 13K.

The injection expansion valve 30 decompresses the refrigerant flowing into the refrigerant pipe 13K, and then the refrigerant flows into the discharge side heat exchanger 35. The refrigerant flowing into the discharge side heat exchanger 35 is discharged from the compressor 2 to the refrigerant pipe 13G, performs heat exchange with the refrigerant before flowing into the radiator 4, and absorbs heat from the refrigerant flowing through the refrigerant pipe 13G to evaporate. In the discharge side heat exchanger 35, the refrigerant distributed to the refrigerant pipe 13K evaporates, whereby the gas injection into the compressor 2 is performed.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Additionally, in the air flow passage 3 on the air upstream side of the radiator 4, an air mix damper 28 is disposed to adjust a degree of flow of the indoor air or the outdoor air through the heat absorber 9 into the radiator 4. Furthermore, in the air flow passage 3 on an air downstream side of the radiator 4, there is formed each outlet (represented by an outlet 29 in FIG. 1) of foot (air is blown out toward each foot of a passenger), vent (the air is blown out toward an upper part of a passenger's body) or defroster (the air is blown out to an inner surface of windshield glass), and in the outlet 29, an outlet changing damper 31 is disposed to perform changing control of blowing of the air from each outlet mentioned above.

Figure 2:
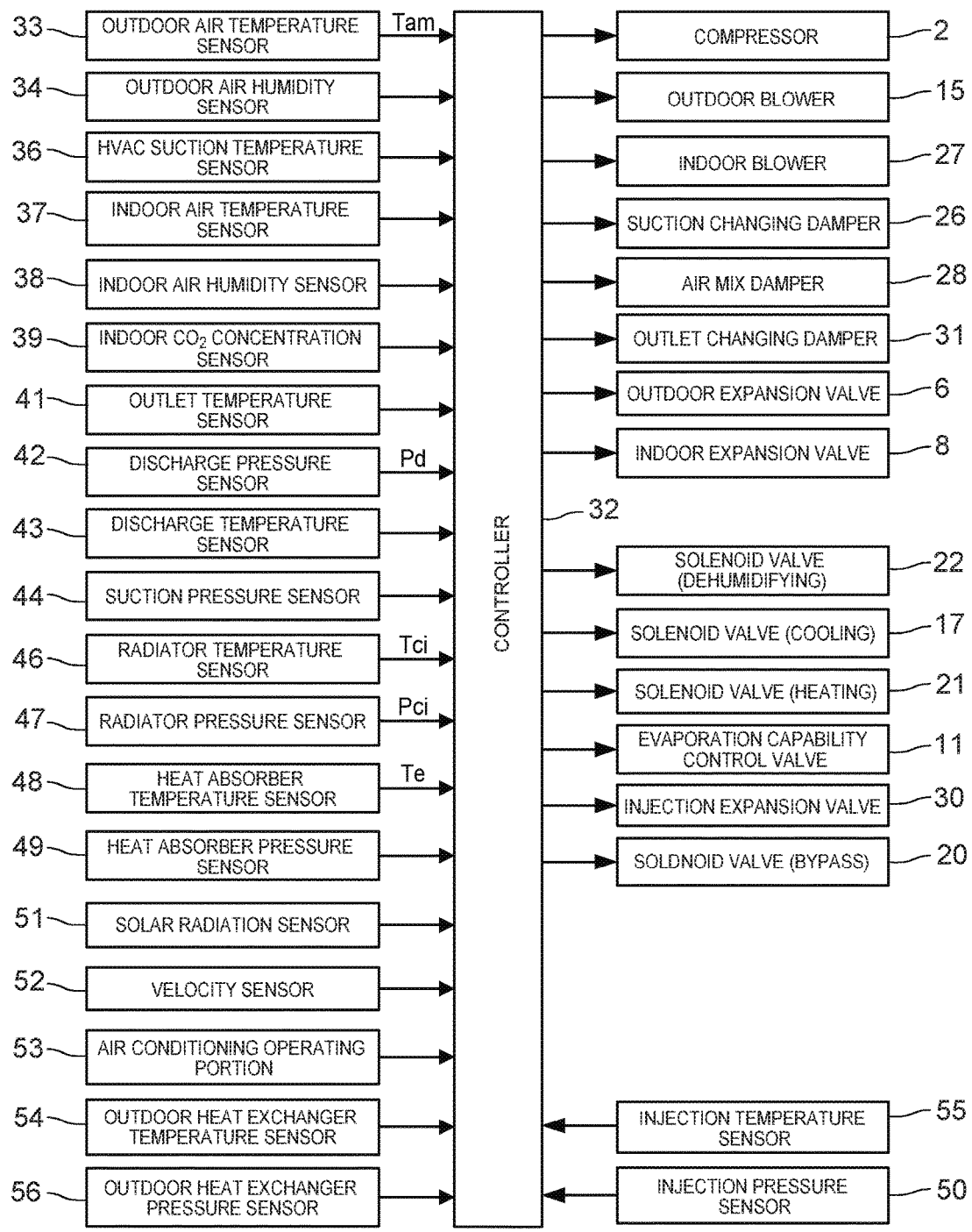
FIG. 2 is a block diagram of an electric circuit of a controller of the vehicular air conditioner of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor air $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the air passed through the radiator 4 or the temperature of the radiator 4 itself or the temperature of the air which has just been heated in the radiator 4), a radiator pressure sensor 47 which detects a refrigerant pressure of the radiator 4 (the pressure in the radiator 4 or the pressure of the refrigerant which has just flowed out from the radiator 4), a heat absorber temperature sensor 48 which detects a temperature of the heat absorber 9 (the temperature of the refrigerant which has just flowed out from the heat absorber 9 or the temperature of the heat absorber 9 itself or the temperature of the air which has just been cooled in the heat absorber 9), a heat absorber pressure sensor 49 which detects a refrigerant pressure of the heat absorber 9 (the pressure in the heat absorber 9 or the pressure of the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (a velocity), an air conditioning operating portion 53 to set the changing of the predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure of the refrigerant in the outdoor heat exchanger 7 or the refrigerant which has just flowed out from the outdoor heat exchanger 7).

Additionally, the input of the controller 32 is further connected to respective outputs of an injection pressure sensor 50 which detects a pressure of an injection refrigerant flowing into the refrigerant pipe 13K of the injection circuit 40 and flowing through the discharge side heat exchanger 35 to return to the middle of the compression by the compressor 2, and an injection temperature sensor 55 which detects a temperature of the injection refrigerant.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, the injection expansion valve 30, and the evaporation capability control valve 11. Further, the controller 32 controls these components on the basis of the outputs of the respective sensors and the setting input by the air conditioning operating portion 53.

Next, an operation of the vehicular air conditioner 1 of the embodiment having the abovementioned constitution will be described. The controller 32 changes and executes respective roughly divided air conditioning operation modes such as a heating mode, a dehumidifying and heating mode, an internal cycle mode, a dehumidifying and cooling mode, and a cooling mode. First, the flow of the refrigerant in each operation mode will be described.

(1) Flow of Refrigerant of Heating Mode

When the heating mode is selected by the controller 32 (automatically) or a manual operation to the air conditioning operating portion 53, the controller 32 opens the solenoid valve 21 and closes the solenoid valve 17, the solenoid valve 22 and the solenoid valve 20. Further, the compressor 2 and the respective blowers 15 and 27 are operated, and the air mix damper 28 has a state where the air blown out from the indoor blower 27 is passed through the radiator 4. In consequence, a high-temperature high-pressure gas refrigerant discharged from the compressor 2 flows through the discharge side heat exchanger 35 and then flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then a part of the refrigerant is distributed to the refrigerant pipe 13K of the injection circuit 40, and mainly flows through the refrigerant pipe 135 to reach the outdoor expansion valve 6. It is to be noted that a function and an operation of the injection circuit 40 will be described later. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15 (heat pump). Further, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29, and hence the heating of the vehicle interior is performed.

In the embodiment, the controller 32 controls a number of revolution of the compressor 2 on the basis of a refrigerant pressure Pci of the radiator 4 (the high pressure of the refrigerant circuit R) which is detected by the radiator pressure sensor 47 (or the discharge pressure sensor 42) and a target radiator pressure PCO, also controls a valve position of the outdoor expansion valve 6 on the basis of a volume of air to be passed through the radiator 4 and an aftermentioned target outlet temperature, and controls a subcool degree of the refrigerant in the outlet of the radiator 4. It is to be noted that the valve position of the outdoor expansion valve 6 may be controlled on the basis of a temperature of the radiator 4 or an outdoor air temperature in place of or in addition to the above conditions.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to loin the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating of the vehicle interior are performed.

In the embodiment, the controller 32 controls the number of revolution of the compressor 2 on the basis of the refrigerant pressure Pci of the radiator 4 (the high pressure of the refrigerant circuit R) which is detected by the radiator pressure sensor 47 (or the discharge pressure sensor 42) and the target radiator pressure PCO, and also controls the valve position of the outdoor expansion valve 6 on the basis of the temperature of the heat absorber 9 (a heat absorber temperature Te) which is detected by the heat absorber temperature sensor 48 and a target heat absorber temperature TEO which is a target value of the temperature of the heat absorber 9. It is to be noted that there will be described later control of the gas injection by the injection circuit 40 in this dehumidifying and heating mode.

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. The outdoor expansion valve 6 and the solenoid valve 21 are closed, whereby inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 6. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, whereby the dehumidifying and heating of the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability deteriorates.

The controller 32 controls the number of revolution of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2. It is to be noted that also in this internal cycle mode, the gas injection by the injection circuit 40 is not performed, and hence the injection expansion valve 30 is shut off (the shut off position).

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Further, the compressor 2 and the respective blowers 15 and 27 are operated, and the air mix damper 28 has the state where all the air blown out from the indoor blower 27 is passed through the radiator 4 (FIG. 1). In consequence, the high-temperature high-pressure gas refrigerant discharged from the compressor 2 flows into the radiator 4 through the discharge side heat exchanger 35. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant, pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), whereby the dehumidifying and cooling in the vehicle interior are performed.

The controller 32 controls the number of revolution of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R (the refrigerant pressure of the radiator 4), and controls a refrigerant pressure of the radiator 4 (the radiator pressure Pci). It is to be noted that control of the injection circuit 40 in this dehumidifying and cooling mode will be described later.

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including a fully open position (the valve position is set to an upper limit of controlling)), and the air mix damper 28 has a state where the air is not passed through the radiator 4. In consequence, the high-temperature high-pressure gas refrigerant discharged from the compressor 2 flows into the radiator 4 through the discharge side heat exchanger 35. The air in the air flow passage 3 is not passed through the radiator 4, the refrigerant therefore only passes the radiator, and the refrigerant flowing out from the radiator 4 flows through the refrigerant pipe 13E to reach the solenoid valve 20 and the outdoor expansion valve 6.

At this time, the solenoid valve 20 is opened and hence the refrigerant bypasses the outdoor expansion valve 6 to pass the bypass pipe 13J, and flows into the outdoor heat exchanger 7 as it is, in which the refrigerant is cooled by the running therein or the outdoor air passed through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion. 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed. In this cooling mode, the controller 32 controls the number of revolution of the compressor 2 on the basis of the temperature of the heat absorber 9 which is detected by the heat absorber temperature sensor 48. It is to be noted that also in this cooling mode, the gas injection by the injection circuit 40 is not performed, and hence the injection expansion valve 30 is shut off (the shut off position).

(6) Changing Control of Operation Modes

At startup, the controller 32 selects the operation mode on the basis of an outdoor air temperature Tam detected by the outdoor air temperature sensor 33 and a target outlet temperature TAO. Additionally, after the startup, the controller selects and changes the above respective operation modes in accordance with a change of an environment or setting conditions such as the outdoor air temperature Tam, the target outlet temperature TAO or the like. In this case, the controller 32 basically shifts from the heating mode to the dehumidifying and heating mode or from the dehumidifying and heating mode to the heating mode, shifts from the dehumidifying and heating mode to the dehumidifying and cooling mode or from the dehumidifying and cooling mode to the dehumidifying and heating mode, and shifts from the dehumidifying and cooling mode to the cooling mode or from the cooling mode to the dehumidifying and cooling mode, but when the controller shifts from the dehumidifying and heating mode to the dehumidifying and cooling mode and shifts from the dehumidifying and cooling mode to the dehumidifying and heating mode, the controller shifts via the above internal cycle mode. Additionally, the controller might shift from the cooling mode to the internal cycle mode or from the internal cycle mode to the cooling mode.

(7) Gas injection by Injection Circuit

Figure 3:
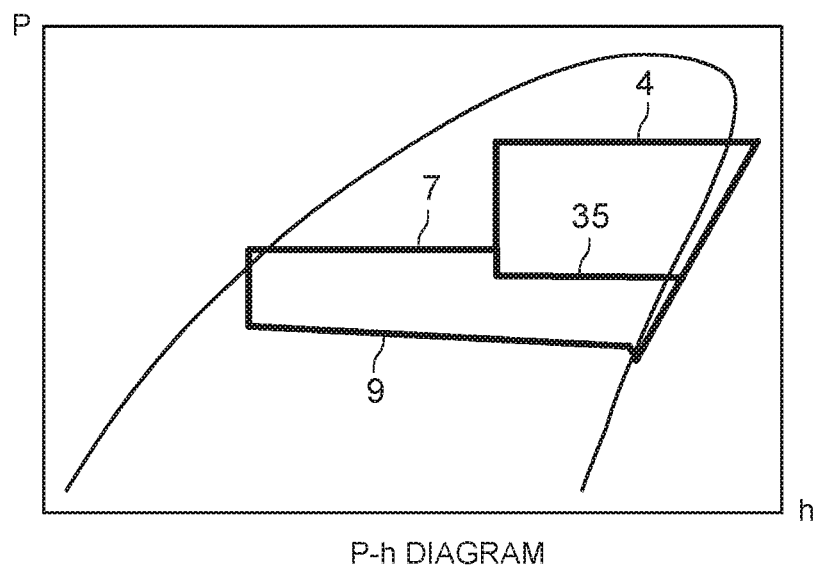
FIG. 3 is a P-h diagram of the vehicular air conditioner of FIG. 1 in a dehumidifying and cooling mode during injection.

Next, the gas injection in the dehumidifying and cooling mode will be described. FIG. 3 shows a P-h diagram of the vehicular air conditioner 1 of the present invention in the dehumidifying and cooling mode. When the injection expansion valve 30 is open, the refrigerant, which flows out from the radiator 4 to enter the refrigerant pipe 13E and is then distributed to flow into the refrigerant pipe 13K of the injection circuit 40, is decompressed by the injection expansion valve 30 to enter the discharge side heat exchanger 35, performs therein heat exchange with the refrigerant discharged from the compressor 2 (the refrigerant discharged from the compressor 2 before flowing into the radiator 4), and absorbs heat to evaporate. Afterward, the evaporated gas refrigerant is further compressed together with the refrigerant which returns to the middle of the compression by the compressor 2 and is sucked from the accumulator 12 to be compressed, and then the refrigerant is discharged from the compressor 2 to the refrigerant pipe 13G again.

In FIG. 3, a line denoted with reference numeral 35 indicates the refrigerant evaporated in the discharge side heat exchanger 35 of the injection circuit 40 and then returned to the middle of the compression by the compressor 2. When the refrigerant is returned from the injection circuit 40 to the middle of the compression by the compressor 2, an amount of the refrigerant to be discharged from the compressor 2 increases, and hence the heating capability in the radiator 4 improves. Additionally, the refrigerant is distributed to the injection circuit 40. Thus, a refrigerant flow rate of the outdoor heat exchanger 7 or the heat absorber 9 decreases, and hence, even when the number of revolution of the compressor 2 is increased, the flow rate of the refrigerant into the heat absorber 9 is prevented or inhibited from being excessive.

On the other hand, when a liquid refrigerant returns to the compressor 2, liquid compression is caused, and hence the refrigerant to be returned from the injection circuit 40 to the compressor 2 has to be a gas. Therefore, the controller 32 monitors a superheat degree of the refrigerant toward the middle of the compression by the compressor 2 from the pressure and the temperature of the refrigerant after the discharge side heat exchanger 35 which are detected by the injection pressure sensor 50 and the injection temperature sensor 55, respectively, and the controller controls the valve position of the injection expansion valve 30 so that a predetermined superheat degree is applied in the heat exchange with the discharged refrigerant. However, in the embodiment, the discharge side heat exchanger 35 performs heat exchange between the remarkably high-temperature refrigerant discharged from the compressor 2 before flowing into the radiator 4 and the refrigerant flowing through the injection circuit 40, and hence a large heat exchange amount can be obtained. Therefore, even when the valve position of the injection expansion valve 30 is increased to increase an injection amount, the refrigerant can sufficiently evaporate in the discharge side heat exchanger 35, and a required superheat degree can be obtained.

In consequence, as compared with a conventional case where heat exchange is performed between the refrigerant after the radiator and the injection refrigerant, an amount of the gas to be injected into the compressor 2 can sufficiently be acquired, and the amount of the refrigerant to be discharged from the compressor 2 can be increased to achieve the improvement of the heating capability of the radiator 4.

Next, a control block of the compressor 2, the outdoor expansion valve 6 and the injection expansion valve 30 of the controller 32 in the above dehumidifying and cooling mode will be described with reference to FIG. 4 to FIG. 9.

(8) Control of Compressor in Dehumidifying and Cooling Mode

Figure 4:
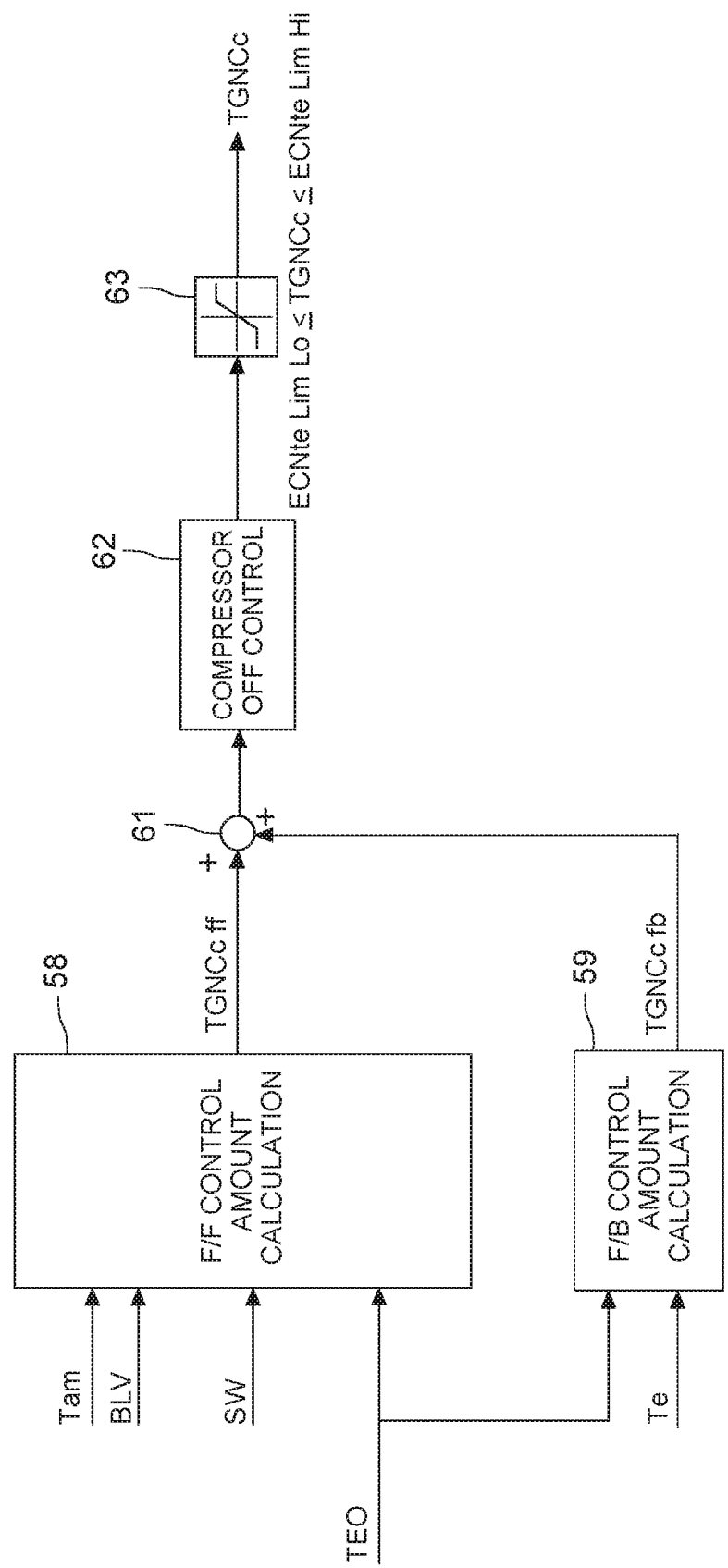
FIG. 4 is a control block diagram concerning compressor control in the dehumidifying and cooling mode by the controller of FIG. 2.

FIG. 4 is a control block diagram of the controller 32 which determines a target number of revolution (a compressor target number of revolution) TGNCc of the compressor 2 for the above dehumidifying and cooling mode (this also applies to the cooling mode). An F/F control amount calculation section 58 of the controller 32 calculates an F/F control amount TGNCcff of the compressor target number of revolution on the basis of the outdoor air temperature Tam, a blower voltage BLV, an air mix damper opening SW of the air mix damper 28 which is obtained by SW=(TAO−Te)/(TH−Te), and the target heat absorber temperature TEO which is the target value of the temperature of the heat absorber 9.

It is to be noted that in the controller 32, there is stored a data table in which a relation between the outdoor air temperature Tam and a heat absorber temperature to obtain a required humidity in the environment of the outdoor air temperature Tam is beforehand obtained, and the target heat absorber temperature TEO mentioned above is determined on the basis of this data table.

Additionally, an F/B (feedback) control amount calculation section 59 calculates an F/B control amount TGNCcfb of the compressor target number of revolution on the basis of the target heat absorber temperature TEO and the heat absorber temperature Te. Further, the F/F control amount TGNCcff calculated by the F/F (feedforward) control amount calculation section 58 and the F/B control amount TGNCcfb calculated by the F/B control amount calculation section 59 are added by an adder 61, and transmitted through a compressor OFF control section 62 (to define a minimum number of revolution at which the compressor 2 is operable) to a limit setting section 63 which attaches limits of an upper limit value of controlling and a lower limit value of controlling, and then the compressor target number of revolution TGNCc is determined. In the dehumidifying and cooling mode and the cooling mode, the controller 32 controls the number of revolution of the compressor 2 on the basis of the compressor target number of revolution TGNCc.

It is to be noted that TAO is a target outlet temperature which is a target value of a temperature of the air from the outlet 29, TH is a temperature (a radiator temperature) of the radiator 4 which is obtained from the radiator temperature sensor 46, Te is a temperature of the heat absorber 9 (a heat absorber temperature) which is obtained from the heat absorber temperature sensor 48, the air mix damper opening SW changes in a range of 0≤SW≤1, 0 indicates an air mix shut-off state in which the air is not passed through the radiator 4, and 1 indicates an air mix fully open state in which all the air in the air flow passage 3 is passed through the radiator 4.

Figure 5:
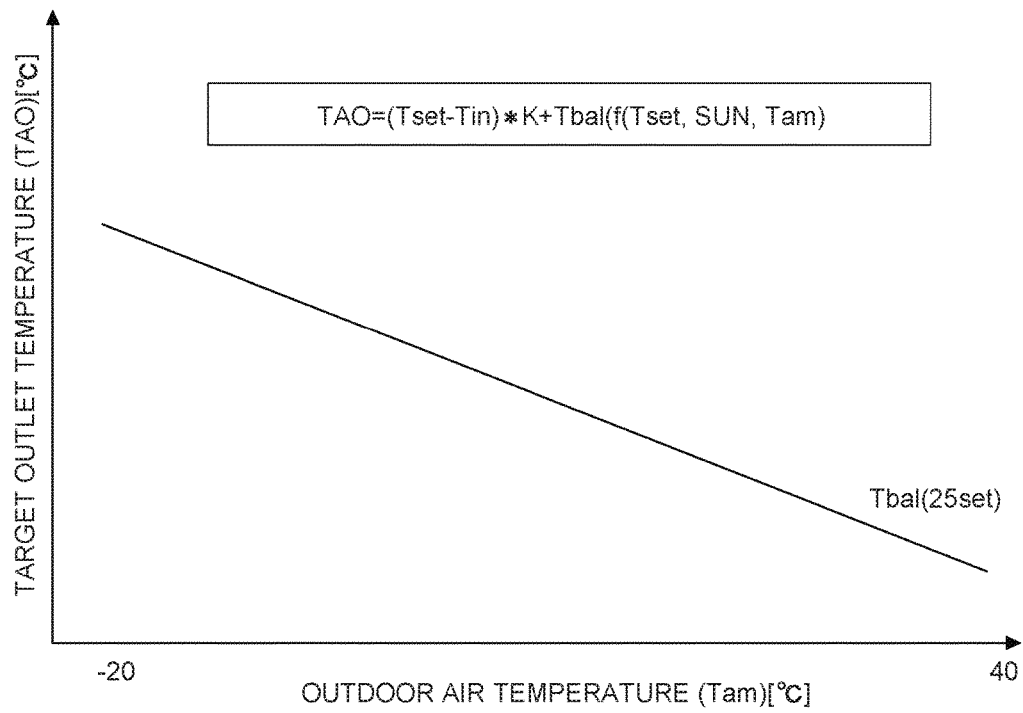
FIG. 5 is a diagram to explain determination of a target outlet temperature by the controller of FIG. 2.

Additionally, the target outlet temperature TAO is a target value of the temperature of the air to be blown out from the outlet 29 to the vehicle interior, and calculated from Equation (1) mentioned below by the controller 32.

$$TAO=(Tset-Tin) \times K+Tbal(f(Tset, SUN, Tam)) \qquad (I),$$

in which Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature becomes as shown in FIG. 5. In addition, the controller 32 calculates a target radiator temperature TCO which is the target value of the temperature of the radiator 4, from the target outlet temperature TAO mentioned above.

(9) Control of Outdoor Expansion Valve in Dehumidifying and Cooling Mode

Figure 6:
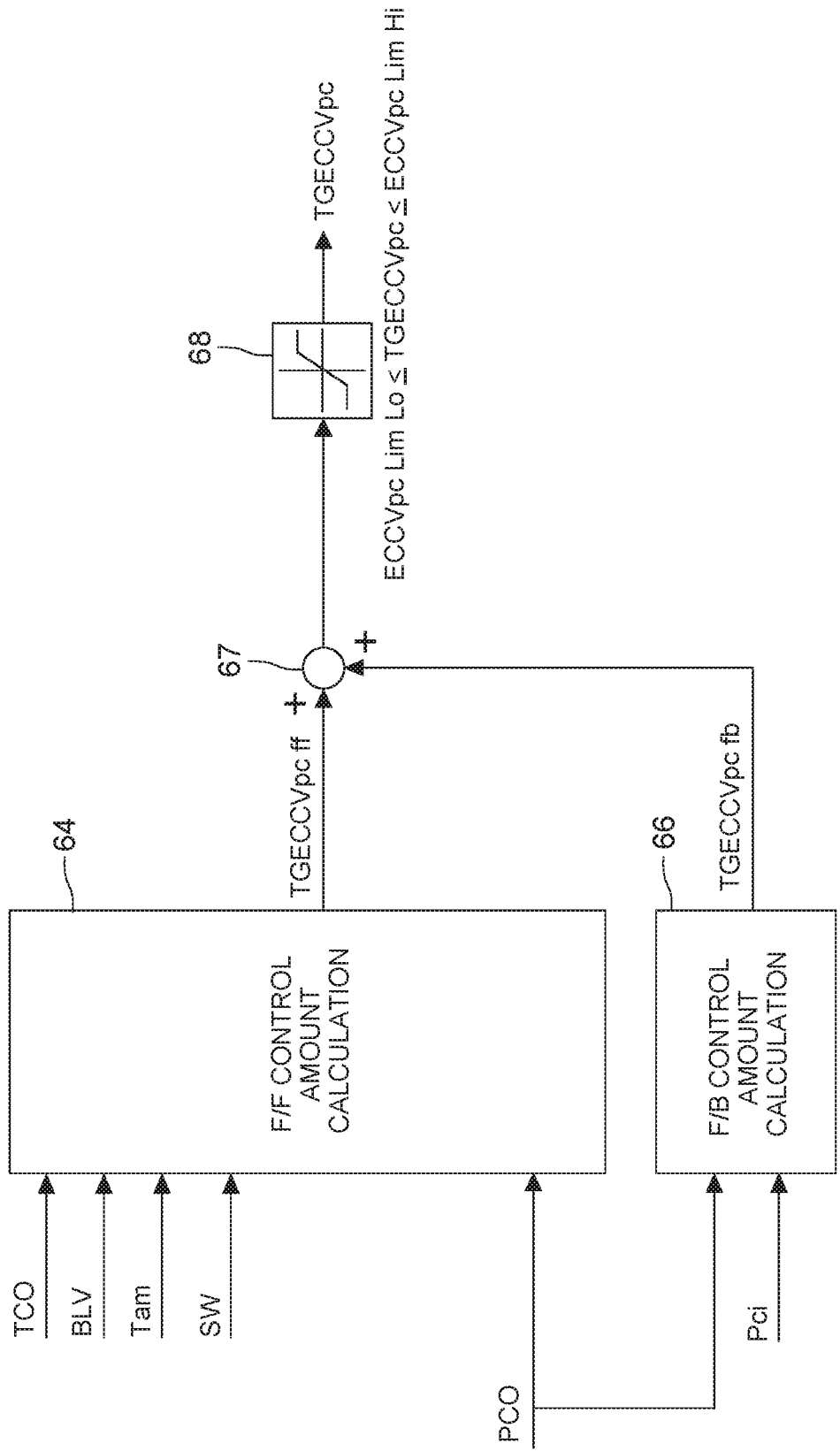
FIG. 6 is a control block diagram concerning control of an outdoor expansion valve in the dehumidifying and cooling mode by the controller of FIG. 2.

Next, FIG. 6 is a control block diagram of the controller 32 which determines a target position (an outdoor expansion valve target position) TGECCVpc of the outdoor expansion valve 6 for the above dehumidifying and cooling mode. An F/F control amount calculation section 64 of the controller 32 calculates an F/F control amount TGECCVpcff of the outdoor expansion valve target position on the basis of the target radiator temperature TCO, the blower voltage BLV, the outdoor air temperature Tam, the air mix damper opening SW, and the target radiator pressure PCO.

In addition, an F/B control amount calculation section 66 calculates an F/B control amount TGECCVpcfb of the outdoor expansion valve target position on the basis of the target radiator pressure PCO and the radiator pressure Pci. Further, the F/F control amount TGECCVpcff calculated by the F/F control amount calculation section 64 and the F/B control amount TGECCVpcfb calculated by the F/B control amount calculation section 66 are added by an adder 67, limits of an upper limit value of controlling and a lower limit value of controlling are attached by a limit setting section 68, and then the outdoor expansion valve target position TGECCVpc is determined. In the dehumidifying and cooling mode, the controller 32 controls the valve position of the outdoor expansion valve 6 on the basis of this outdoor expansion valve target position TGECCVpc.

(10) Control 1 of Injection Expansion Valve in Dehumidifying and Cooling Mode

Figure 7:
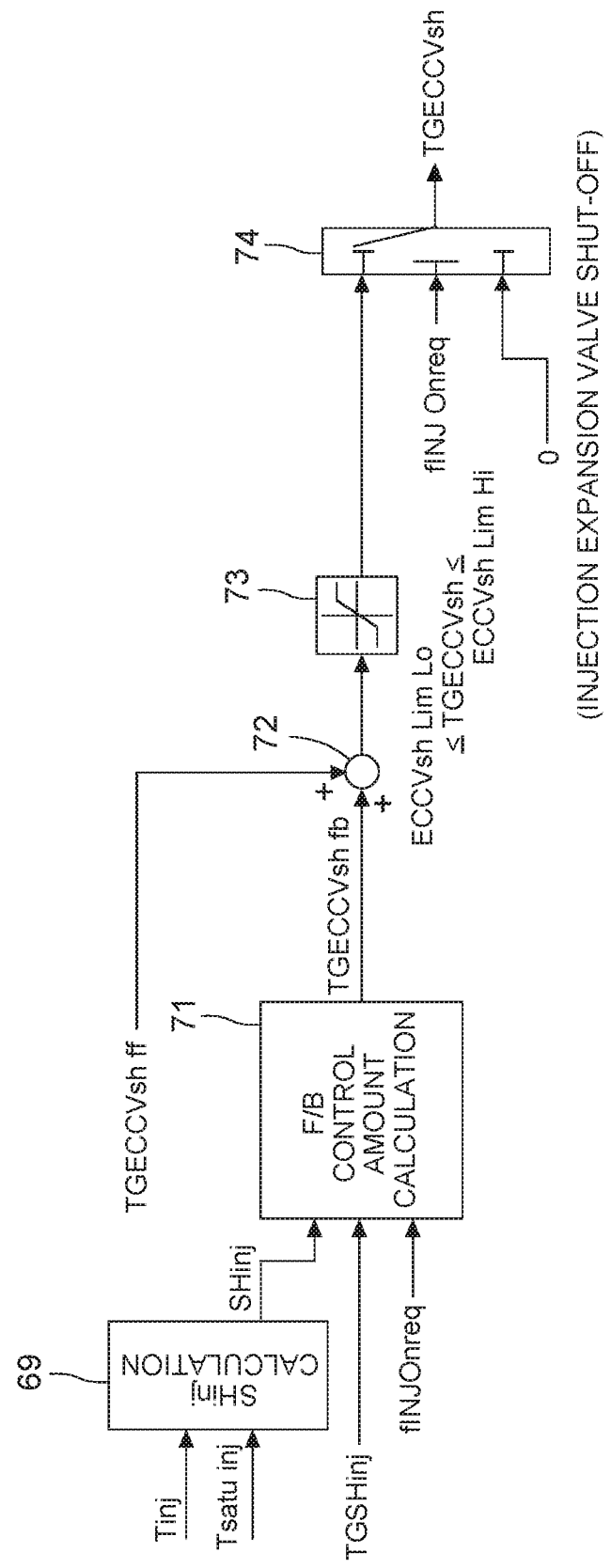
FIG. 7 is a control block diagram concerning control of an injection expansion valve in the dehumidifying and cooling mode by the controller of FIG. 2.

Next, FIG. 7 is a control block diagram of the controller 32 which determines a target position (an injection expansion valve target position) TGECCVsh of the injection expansion valve 30 of the injection circuit 40 for the dehumidifying and cooling mode. An injection refrigerant superheat degree calculation section 69 of the controller 32 calculates a superheat degree (an injection refrigerant superheat degree) SHinj of the injection refrigerant to be returned from the injection circuit 40 through the discharge side heat exchanger 35 to the middle of the compression by the compressor 2, on the basis of a difference between a temperature (an injection refrigerant temperature Tinj) of the injection refrigerant which is detected by the injection temperature sensor 55 and a saturation temperature Tsatuinj.

Next, an F/B control amount calculation section 71 calculates an F/B control amount TGECCVshfb of the injection expansion valve target position on the basis of the injection refrigerant superheat degree SHinj calculated by the injection refrigerant superheat degree calculation section 69, and a target value (a target injection refrigerant superheat degree TGSHinj) of the superheat degree of the injection refrigerant to be returned from the injection circuit 40 to the middle of the compression by the compressor 2. It is to be noted that a determining method of the target injection refrigerant superheat degree TGSHinj will be described later in detail. Additionally, the F/B control amount calculation section 71 operates when an injection requirement flag fINJOnreq is "1" (set), and stops the calculation when the flag is "0" (reset).

Further, the F/B control amount TGECCVshfb calculated by the F/B control amount calculation section 71 and an F/F control amount TGECCVshff of the injection expansion valve 30 which is beforehand determined are added by an adder 72, limits of a controlling upper limit value and a controlling lower limit value are attached by a limit setting section 73, and then the control amount is input into an injection feasibility changing section 74. Into the injection feasibility changing section 74, "0" (the injection expansion valve 30 is shut off) is further input, and when the injection requirement flag fINJOnreq is "1" (set), the value through the limit setting section 73 is determined as the injection expansion valve target position TGECCVsh and output.

It is to be noted that the injection feasibility changing section 74 outputs "0" as the injection expansion valve target position TGECCVsh, when the injection requirement flag fINJOnreq is "0" (reset). That is, when the injection requirement flag fINJOnreq is set to "1", the controller 32 determines the injection expansion valve target position TGECCVsh of the injection expansion valve 30 on the basis of the superheat degree SHinj of the injection refrigerant and the target injection refrigerant superheat degree TGSHinj, and controls the valve position, and when the injection requirement flag fINJOnreq is reset to "0", the controller closes the injection expansion valve 30 (the valve position is "0" and the valve is shut off), and stops the gas injection by the injection circuit 40.

(11) Gas Injection Control 1 in Dehumidifying and Cooling Mode

Figure 8:
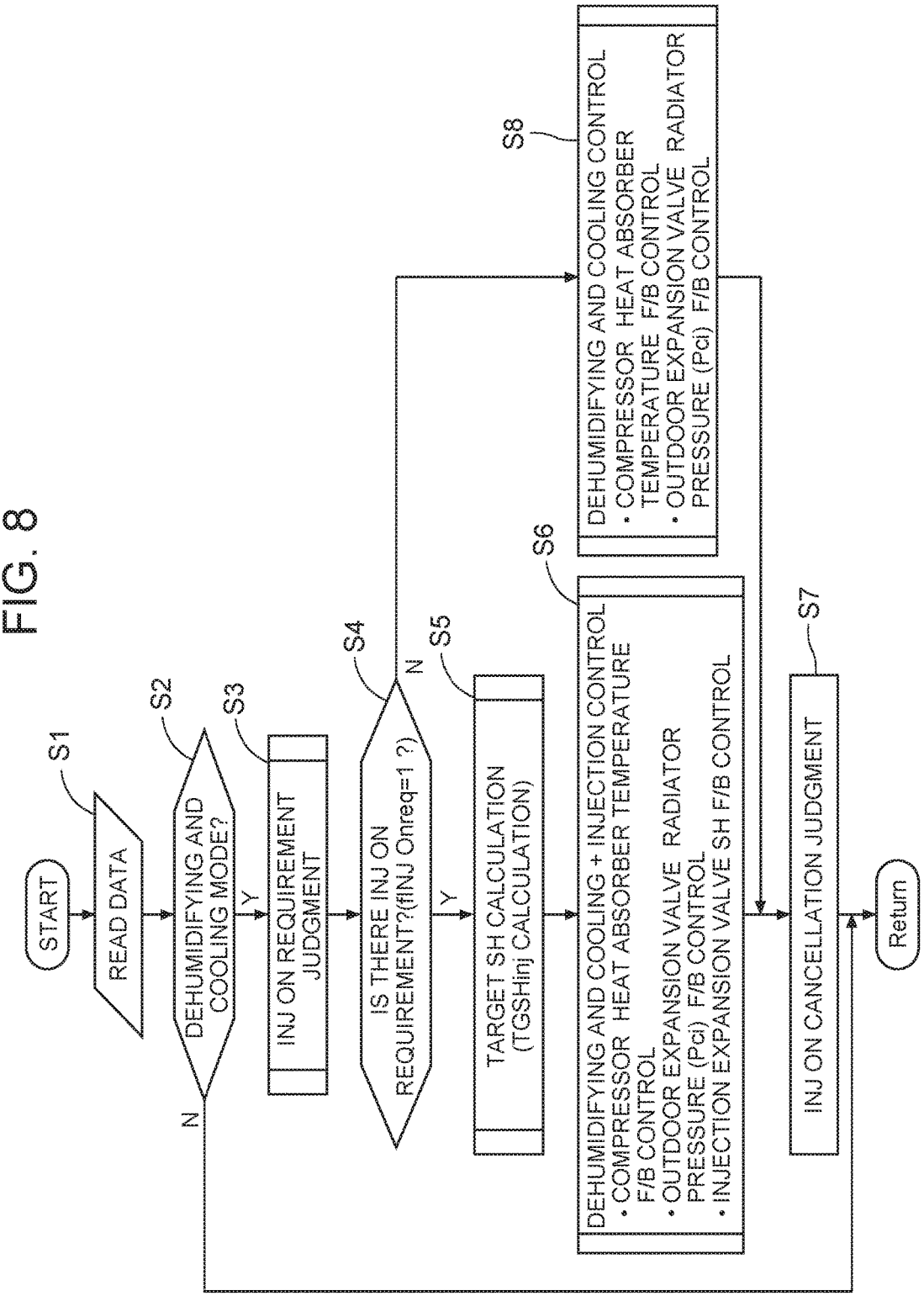
FIG. 8 is a flowchart to explain an operation of the controller of FIG. 2.

Next, specific gas injection control in the dehumidifying and cooling mode by the controller 32 will be described. FIG. 8 is a flowchart to explain an operation of the controller 32 in this case. The controller 32 reads data from each sensor in step S1 of FIG. 8 and judges, in step S2, whether the vehicular air conditioner is in the dehumidifying and cooling mode at present. In the dehumidifying and cooling mode, the controller advances to step S3 to judge whether or not there is a gas injection requirement (INJON requirement, i.e., whether or not to operate the injection circuit 40).

(11-1) Gas injection Requirement Judgment 1

Next, there will be described the judgment of the gas injection requirement by the controller 32 in the step S3. In this embodiment, the controller 32 judges that there is the gas injection requirement (there is the INJON requirement) in a case where condition of (i) mentioned below is established, and sets information injection requirement flag fINJOnreq mentioned above to "1" (set). That is, the condition is as follows.

(i) Radiator Capability Shortage Condition

The radiator capability shortage condition is judgment criteria of whether or not the heating capability in the radiator 4 (the heating capability) runs short, and in the embodiment, it is judged that the radiator capability shortage condition is established when all of the following conditions are established:

(TCO−TH)≥A1;
(PCO−Pci)≥B1; and
Elapsed time after the startup≥t1.

That is, after elapse of predetermined time t1 from the startup, the controller 32 judges that the radiator capability shortage condition is established in a case where a difference between the target radiator temperature TCO and the radiator temperature TH increases to a predetermined value A1 or more and a difference between the target radiator pressure PCO and the radiator pressure Pci increases to a predetermined value B1 or more, and the controller sets a radiator capability shortage flag fHTRlack to "1" (set). It is to be noted that there may be used one of conditions of a case where the difference between the target radiator temperature TCO and the radiator temperature TH increases to the predetermined, value A1 or more and a case where the difference between the target radiator pressure PCO and the radiator pressure Pci increases to the predetermined value B1 or more. Additionally, the above A1 and B1 are predetermined threshold values by which it can be judged that the difference between the actual temperature or pressure of the radiator 4 and the target value enlarges and that the heating capability runs short. Additionally, t1 is time for which the judgment is not performed from the startup until an operation state is stabilized, and, for example, about five minutes.

In this embodiment, as described above, in the step S3, the controller 32 judges the radiator capability shortage condition, and sets the injection requirement flag fiNJOnreq ("1") in a case where the condition is established and the radiator capability shortage flag fHTRlack is set ("1").

Next, in step S4, the controller 32 judges whether or not the injection requirement flag fINJOnreq is set and there is the gas injection requirement (the INJON requirement), and in a case where the injection requirement flag fiNJOnreq is set, the controller advances to step S5 to calculate the target injection refrigerant superheat degree TGSHinj.

Figure 9:
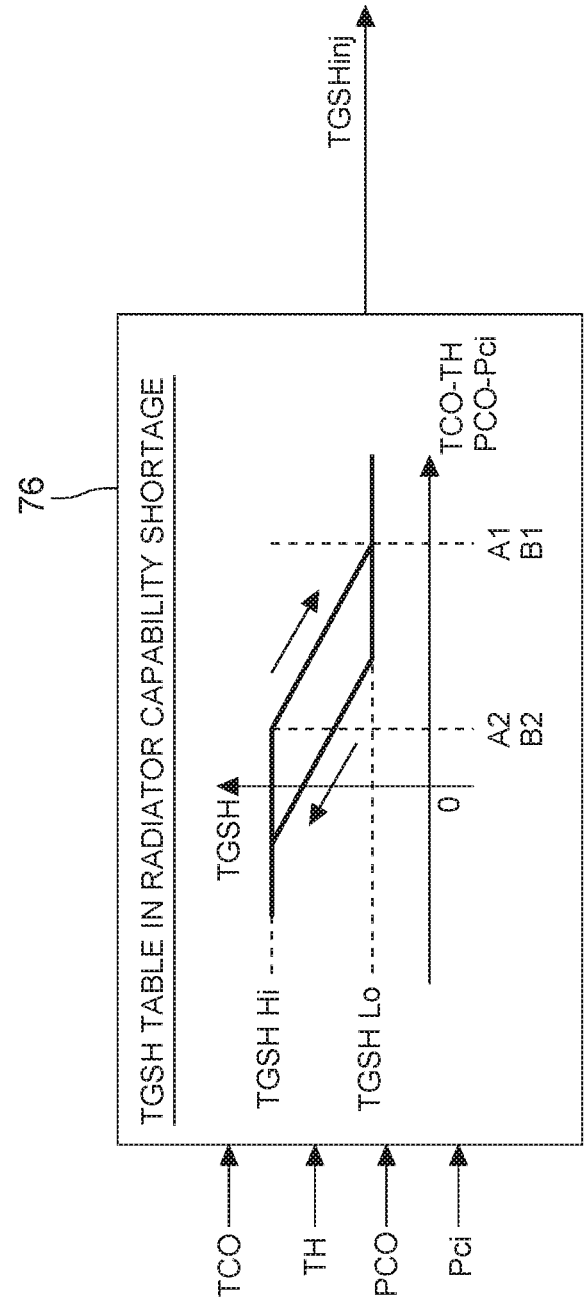
FIG. 9 is a control block diagram of one embodiment concerning determination of a target injection refrigerant superheat degree of an injection circuit in the dehumidifying and cooling mode by the controller of FIG. 2.

FIG. 9 is a control block diagram concerning determination of the target injection refrigerant superheat degree TGSHinj by the controller 32 in this case. A TGSH calculation section in radiator capability shortage 76 of the controller 32 determines the target injection refrigerant superheat degree TGSHinj on the basis of a predetermined TGSH table in radiator capability shortage (FIG. 9). In this case, the TGSH calculation section in radiator capability shortage 76 defines the target injection refrigerant superheat degree TGSHinj as a predetermined high value TGSHHi in a case where a difference (TCO−TH) between the target radiator temperature TCO and the radiator temperature TH is the abovementioned A2 or less and/or in a case where a difference (PCO−Pci) between the target radiator pressure PCO and the radiator pressure Pci is the abovementioned B2 or less. When this refrigerant superheat degree is high, it is meant that the gas injection amount is small.

Additionally, in a case where TCO−TH is the abovementioned A1 or more and/or in a case where PCO−Pci is the abovementioned B1 or more, the target injection refrigerant superheat degree TGSHinj is defined as a predetermined low value TGSHLo. When this refrigerant superheat degree is low, it is meant that the gas injection amount is large.

Further, in a case where TCO−TH is present between A2 and A1 and/or PCO−Pci is present between B2 and B1, the target injection refrigerant superheat degree TGSHinj is linearly changed between TGSHHi and TGSHLo with a predetermined hysteresis.

That is, the controller 32 changes the target injection refrigerant superheat degree TGSHinj to decrease the gas injection amount when the difference (TCO−TH) between the target radiator temperature TCO of the radiator 4 and the radiator temperature TH and the difference (PCO−Pci) between the target radiator pressure PCO and the radiator pressure Pci are small, and to increase the gas injection amount when the differences are large. In this embodiment, the controller 32 calculates the target injection refrigerant superheat degree TGSHinj in this way.

Further, in step S6, the controller 32 executes the dehumidifying and cooling mode in which the injection circuit 40 is operated. That is, the controller determines the target compressor number of revolution TGNCc of the compressor 2 on the basis of the target heat absorber temperature TEO and the heat absorber temperature Te as described with reference to FIG. 4, executes feedback control of the number of revolution of the compressor 2, determines the outdoor expansion valve target position TGECCVpc of the outdoor expansion valve 6 on the basis of the target radiator pressure PCO (the target value of the high pressure) and the radiator pressure Pci as described with reference to FIG. 6, and executes the feedback control of the valve position of the outdoor expansion valve 6. Further, the controller determines the injection expansion valve target position TGECCVsh of the injection expansion valve 30 as described with reference to FIG. 7 on the basis of the target injection refrigerant superheat degree TGSHinj determined in FIG. 9, and executes the feedback control of the valve position of the injection expansion valve 30 to control the amount of the gas to be injected to the middle of the compression by the compressor 2.

(11-2) Gas Injection Requirement Cancellation Judgment 1

Next, in step S7, the controller 32 judges whether or not cancellation (stop of the operation of the injection circuit 40) condition of the gas injection requirement (the INJON requirement) is established. Next, there will be described the judgment of the gas injection requirement cancellation by the controller 32 in the step S7. In the embodiment, the controller 32 judges the gas injection requirement cancellation (INJON cancellation) in a case where condition of (ii) mentioned below is established, and resets the abovementioned injection requirement flag fiNJOnreq to "0" (reset). That is, the condition is as follows.

(ii) Dehumidifying Capability Shortage Condition

The dehumidifying capability shortage condition is judgment criteria of whether or not the dehumidifying capability in the heat absorber 9 runs short, and in the embodiment, it is judged that the dehumidifying capability shortage condition is established, when all of the following conditions are established:

(TCO−TH)≤A2;
(PCO−Pci)≤B2; and
(TEO−Te)≤C3.

That is, in a case where the difference between the target radiator temperature TCO and the radiator temperature TH decreases to the predetermined value A2 or less, the difference between the target radiator pressure PCO and the radiator pressure Pci decreases to the predetermined value B2 or less, and a difference (TEO−Te) between the target heat absorber temperature TEO and the heat absorber temperature Te is smaller than a predetermined value C3, the controller 32 judges that the dehumidifying capability shortage condition is established, and sets a dehumidifying capability shortage flag fEVAlack to "1" (set). It is to be noted that in the embodiment, when there are established all of the case where the difference between the target radiator temperature TCO and the radiator temperature TH decreases to the predetermined value A2 or less, the case where the difference between the target radiator pressure PCO and the radiator pressure Pci decreases to the predetermined value B2 or less and the case where the difference (TEO−Te) between the target heat absorber temperature TEO and the heat absorber temperature Te is smaller than the predetermined value C3, it is judged that the dehumidifying capability shortage condition is established. However, the present invention is not limited to the embodiment, and when one or any combination of the conditions is established, it may be judged that the dehumidifying capability shortage condition is established. Additionally, C3 is a predetermined threshold values by which it can be judged that the temperature of the heat absorber 9 is insufficient (the heat absorber temperature Te rises).

In the step S7, the controller 32 judges the dehumidifying capability shortage condition as described above in this embodiment, and resets the injection requirement flag fINJOnreq ("0") in a case where the condition is established to set the dehumidifying capability shortage flag fEVAlack ("1").

In consequence, the controller 32 advances from the step S4 to step S8. In this step S8, the controller executes the dehumidifying and cooling mode in which the injection circuit 40 is stopped. That is, the controller determines the target compressor number of revolution TGNCc of the compressor 2 on the basis of the target heat absorber temperature TEO and the heat absorber temperature Te as described with reference to FIG. 4, executes the feedback control of the number of revolution of the compressor 2 determines the outdoor expansion valve target position TGECCVpc of the outdoor expansion valve 6 on the basis of the target radiator pressure PCO (the target value of the high pressure) and the radiator pressure Pci as described, with reference to FIG. 6, and executes the feedback control of the valve position of the outdoor expansion valve 6.

Embodiment 2

It is to be noted that the judgment of the gas injection requirement in the step S3 of FIG. 8 is not limited to the above embodiment, and the requirement may be judged by adding low outdoor air temperature startup condition on which startup is performed at a low outdoor air temperature mentioned below.

(11-3) Gas Injection Requirement Judgment 2

That is, in this embodiment, a controller 32 judges that there is a gas injection requirement (there is an INJON requirement) in a case where low outdoor air temperature startup condition of (iii) mentioned below is established in addition to the above radiator capability shortage condition of (i) in the judgment of the gas injection requirement in the step S3 of FIG. 8, and the controller sets the abovementioned injection requirement flag fINJOnreq to "1" (set).

(iii) Low Outdoor Air Temperature Startup Condition

The low outdoor air temperature startup condition is judgment criteria of whether or not the startup is performed at the low outdoor air temperature, and in the embodiment, it is judged that the low outdoor air temperature startup condition is established when all of the following conditions are established:

Tam<T1;
TAO>TA1; and
Elapsed time after the startup<t1.

That is, within time shorter than predetermined time t1 from the startup and in a case where an outdoor air temperature Tam is lower than a predetermined value T1 and a target outlet temperature TAO into a vehicle interior is higher than a predetermined value TA1, the controller 32 judges that the low outdoor air temperature startup condition is established, and sets a low outdoor air temperature startup flag fHeatUp to "1" (set). It is to be noted that the above T1 and TA1 are predetermined threshold values by which it can be judged that the outdoor air temperature is low and a high value is also required for a temperature of hot air to be blown out into the vehicle interior, and, for example, T1 is +10° C. and TA1 is +40° C. Additionally, T1 is about 5 minutes in the same manner as described above.

In this embodiment, the controller 32 judges the radiator capability shortage condition and the low outdoor air temperature startup condition in the step S3 as described above, and in a case where both the conditions are established, a radiator capability shortage flag fHTRlack is set ("1") and the low outdoor air temperature startup flag fHeatUp is set ("1"), the injection requirement flag fINJOnreq is set ("1").

Next, in step S4, the controller 32 judges whether or not the injection requirement flag fINJOnreq is set and there is a gas injection requirement (an INJON requirement), and in a case where the injection requirement flag fINJOnreq is set, the controller advances to step S5 to calculate a target injection refrigerant superheat degree TGSHinj.

Figure 10:
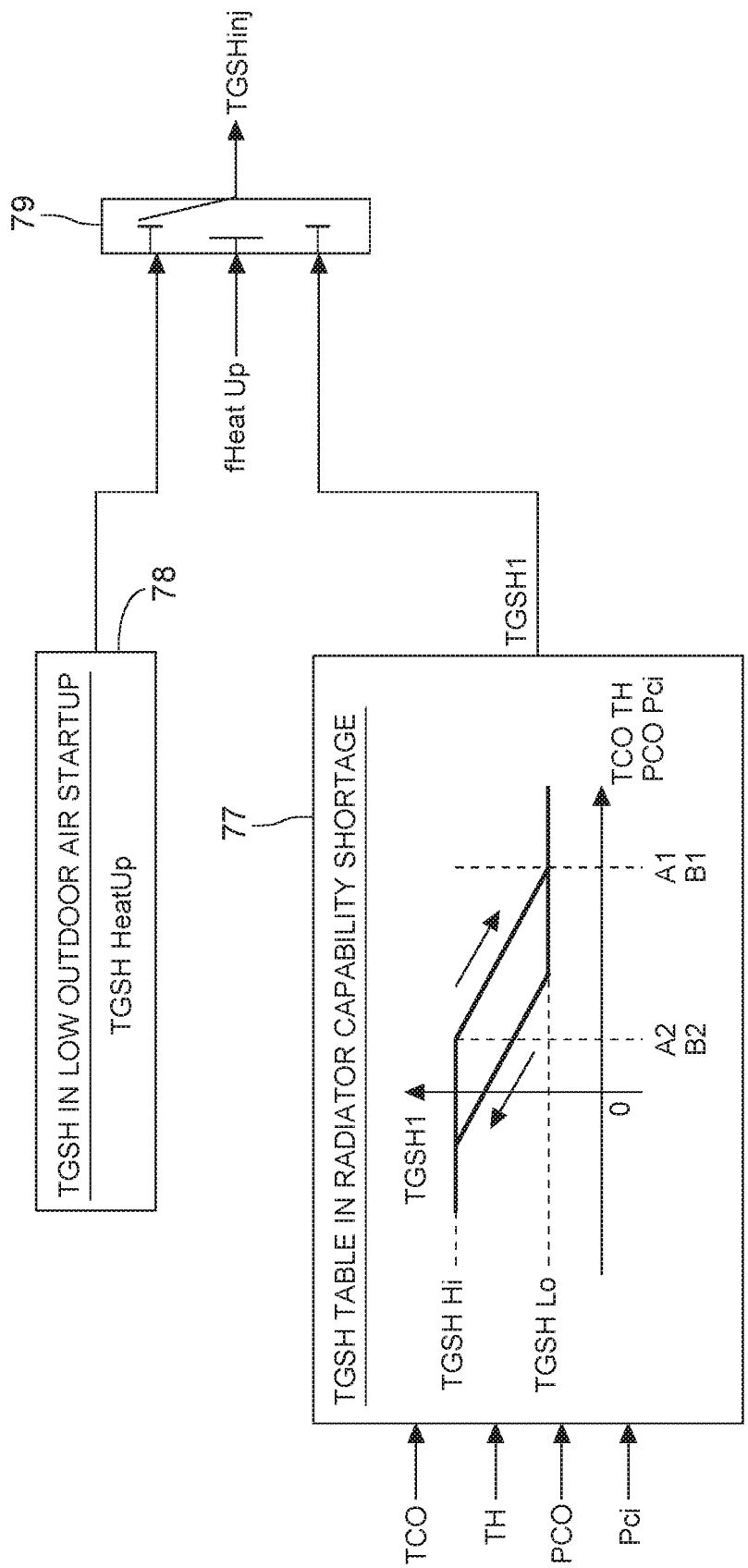
FIG. 10 is a control block diagram of another embodiment concerning the determination of the target injection refrigerant superheat degree of the injection circuit in the dehumidifying and cooling mode by the controller of FIG. 2.

FIG. 10 is a control block diagram concerning determination of a target injection refrigerant superheat degree TGSHinj by the controller 32 in this case. A TGSH calculation section in radiator capability shortage 77 of the controller 32 in this case determines a target injection refrigerant superheat degree TGSH1 in radiator capability shortage in this case, on the basis of a TGSH table in radiator capability shortage (FIG. 10) determined beforehand, in the same manner as in the TGSH calculation section in radiator capability shortage 76 of FIG. 9. Also in this case, the TGSH calculation section in radiator capability shortage 77 defines the target injection refrigerant superheat degree in radiator capability shortage TGSH1 as a predetermined high value TGSHHi, in a case where a difference (TCO−TH) between a target radiator temperature TCO and a radiator temperature TH is the abovementioned A2 or less, and/or a difference (PCO−Pci) between a target radiator pressure PCO and a radiator pressure Pci is the abovementioned B2 or less.

Additionally, in a case where TCO−TH is the abovementioned A1 or more and/or in a case where PCO−Pci is the abovementioned B1 or more, the target injection refrigerant superheat degree in radiator capability shortage TGSH1 is defined as a predetermined low value TGSHLo.

Further, in a case where TCO−TH is present between A2 and A1 and/or PCO−Pci is present between B2 and B1, the target injection refrigerant superheat degree in radiator capability shortage TGSH1 is linearly changed between TGSHHi and TGSHLo with a predetermined hysteresis.

That is, the controller 32 changes the target injection refrigerant superheat degree in radiator capability shortage TGSH1 to decrease a gas injection amount when the difference (TCO−TH) between the target radiator temperature TCO of the radiator 4 and the radiator temperature TH and the difference (PCO−Pci) between the target radiator pressure PCO and the radiator pressure Poi are small, and to increase the gas injection amount when the differences are large.

The target injection refrigerant superheat degree in radiator capability shortage TGSH1 determined by the TGSH calculation section in radiator capability shortage 77 is input into a TGSH changing section 79. Further into the TGSH changing section 79, there is input a target injection refrigerant superheat degree in low outdoor air temperature startup TGSHHeatUp determined by a TGSH calculation section at low outdoor air temperature 78. It is to be noted that the target injection refrigerant superheat degree in low outdoor air temperature startup TGSHHeatUp is fixed to a predetermined value to increase the gas injection amount at the startup. Further, in a case where the abovementioned low outdoor air temperature startup flag fHeatUp is set ("1") and in a case where the target injection refrigerant superheat degree in low outdoor air temperature startup TGSHHeatUp is reset ("0"), the target injection refrigerant superheat degree in radiator capability shortage TGSH1 is output from the TGSH changing section 79, and a target injection refrigerant superheat degree TGSHinj in this case is calculated. The subsequent control in step S6 is similar to the abovementioned embodiment.

It is to be noted that in the embodiment, when the gas injection requirement is judged, all of two types of conditions of the radiator capability shortage condition and the low outdoor air temperature startup condition are judged, but the present invention is not limited to this embodiment, and the low outdoor air temperature startup condition may only be judged.

(11-4) Gas injection Requirement Cancellation Judgment 2

Additionally, in this case, the controller 32 performs judgment as to outdoor air temperature rise condition of (iv) mentioned below in addition to the abovementioned dehumidifying capability shortage condition of (ii) in the judgment of injection requirement cancellation in the step S7 of FIG. 8, and in a case where one of the conditions is established, the controller judges gas injection requirement cancellation (INJON cancellation), and sets the abovementioned injection requirement flag fINJOnreq to "0" (reset). That is, the condition is as follows.

(iv) Outdoor Air Temperature Rise Condition

The outdoor air temperature rise condition is judgment criteria of whether or not the outdoor air temperature rises to get out from low outdoor air temperature environment, and in the embodiment, it is judged that the outdoor air temperature rise condition is established when all of the following conditions are established:

Tam>T2; and

TAO<TA2.

That is, in a case where the outdoor air temperature Tam is higher than a predetermined value 12 and the target outlet temperature TAO to the vehicle interior is lower than a predetermined value TA2, the controller 32 judges that the outdoor air temperature rise condition is established, and sets an outdoor air temperature rise flag fTamUp to "1" (set). It is to be noted that 12 and TA2 are predetermined threshold values by which it can be judged that the outdoor air temperature is high and the temperature of the hot air to be blown out to the vehicle interior drops.

In step S7, in this embodiment, the controller 32 judges all of the outdoor air temperature rise condition and the dehumidifying capability shortage condition, and resets the injection requirement flag fINJOnreq ("0") in a case where one of these types of conditions is established and one of the outdoor air temperature rise flag fTamUp and a dehumidifying capability shortage flag fEVAlack is set ("1").

It is to be noted that in this embodiment, when the as injection requirement cancellation is judged, all of the two types of conditions, i.e., the outdoor air temperature rise condition and the dehumidifying capability shortage condition are judged, but the present invention is not limited to this embodiment, and the outdoor air temperature rise condition may only be judged.

As described above in the respective embodiments, the present invention includes the injection circuit 40 which distributes a part of the refrigerant flowing out from the radiator 4 to return the part of the refrigerant to the middle of the compression by the compressor 2, and in the dehumidifying and cooling mode, the controller 32 operates the injection circuit 40 and returns the refrigerant to the middle of the compression by the compressor 2, in a case where there is established the above predetermined radiator capability shortage condition on which the heating capability of the radiator 4 runs short and/or the above predetermined low outdoor air temperature startup condition on which the startup is performed at the low outdoor air temperature. Therefore, in the case where the heating capability of the radiator 4 runs short or when the startup is performed at the low outdoor air temperature, the injection circuit 40 returns the part of the refrigerant flowing out from the radiator 4 to the middle of the compression by the compressor 2 and increases the flow rate of the refrigerant into the radiator 4. Consequently, the heating capability of the radiator 4 can improve.

On the other hand, by the distribution into the injection circuit 40, the flow rate of the refrigerant flowing through the outdoor heat exchanger 7 and the like into the heat absorber 9 decreases, and hence a number of revolution NC of the compressor 2 can be increased. Also in this case, the heating capability of the radiator 4 can be acquired, and the frosting of the outdoor heat exchanger 7 can be prevented, or inhibited.

Consequently, in the dehumidifying and cooling mode, the temperatures of the radiator 4 and the heat absorber 9 are appropriately controlled, and the heating capability of the radiator 4 is acquired while avoiding the frosting of the heat absorber 9, so that the dehumidifying and cooling can smoothly be achieved.

In this case, after the elapse of the predetermined time t1 from the startup, the controller 32 judges that the radiator capability shortage condition is established in the case where the difference between the target radiator temperature TCO and the radiator temperature TH increases to A1 or more and/or the difference between the target radiator pressure PCO and the radiator pressure Poi increases to B1 or more, so that it is possible to precisely judge that the heating capability of the radiator 4 runs short.

Additionally, in Embodiment 1, the controller 32 stops the operation of the injection circuit 40 when there is established one, any combination or all of the case where the difference between the target radiator temperature TCO and the radiator temperature TH decreases to A2 or less, the case where the difference between the target radiator pressure PCO and the radiator pressure Pci decreases to B2 or less, and the case where the difference between the target heat absorber temperature TEO and the heat absorber temperature Te is smaller than C3. Consequently, it is judged that the shortage state of the heating capability of the radiator 4 is resolved, so that the operation of the injection circuit 40 can precisely be stopped.

Additionally, in Embodiment 2, within predetermined time shorter than the time t1 from the startup, the controller 32 judges that the low outdoor air temperature startup condition is established in the case where the outdoor air temperature Tam is low and the target outlet temperature TAO to the vehicle interior is high, so that it is possible to precisely judge that the startup is performed at the low outdoor air temperature.

Further, in this case, the controller stops the operation of the injection circuit 40 in the case where the outdoor air temperature Tam rises higher than the predetermined value T2 and the target outlet temperature TAO drops lower than the predetermined value TA2, so that the resolution of the low outdoor air temperature environment can precisely be judged to stop the operation of the injection circuit 40.

Especially, as in the refrigerant circuit R of the embodiment, the vehicular air conditioner includes the outdoor expansion valve 6 which decompresses the refrigerant flowing into the outdoor heat exchanger 7, and the controller 32 controls the number of revolution NC of the compressor 2 on the basis of the target heat absorber temperature TEO of the heat absorber 9, and the controller controls the valve position of the outdoor expansion valve 6 on the basis of the target radiator pressure PCO of the radiator 4. In this case, the present invention is remarkably effective.

Additionally, in the embodiment, the injection circuit 40 has the injection expansion valve 30, and the discharge side heat exchanger 35 which performs the heat exchange between the refrigerant decompressed by this injection expansion valve 30 and the refrigerant discharged from the compressor 2 before flowing into the radiator 4, and the controller 32 controls the valve position of the injection expansion valve 30 on the basis of the injection refrigerant superheat degree SHinj of the refrigerant to be returned to the middle of the compression by the compressor 2 by the injection circuit 40 and the predetermined target injection refrigerant superheat degree TGSHinj. Consequently, it is possible to precisely perform the gas injection into the compressor 2.

Further, at this time, in the case where the radiator capability shortage condition is established, the controller 32 increases the target injection refrigerant superheat degree TGSHinj when the difference between the target radiator temperature TCO and the radiator temperature TH is small and/or when the difference between the target radiator pressure PCO and the radiator pressure Pci is small, and the controller decreases the target injection refrigerant superheat degree TGSHinj when the difference between the target radiator temperature TCO and the radiator temperature TH is large and/or when the difference between the target radiator pressure FCC and the radiator pressure Pci is large. Consequently, when the heating capability of the radiator 4 is comparatively sufficient, the target injection refrigerant superheat degree TGSHinj is increased to decrease the amount of the gas to be injected to the middle of the compression by the compressor 2, and when the heating capability of the radiator 4 runs short, the target injection refrigerant superheat degree TGSHinj is decreased to increase the amount of the gas to be injected to the middle of the compression by the compressor 2, so that control can appropriately be executed without any excess or shortage in the gas injection amount.

Embodiment 3

Figure 11:
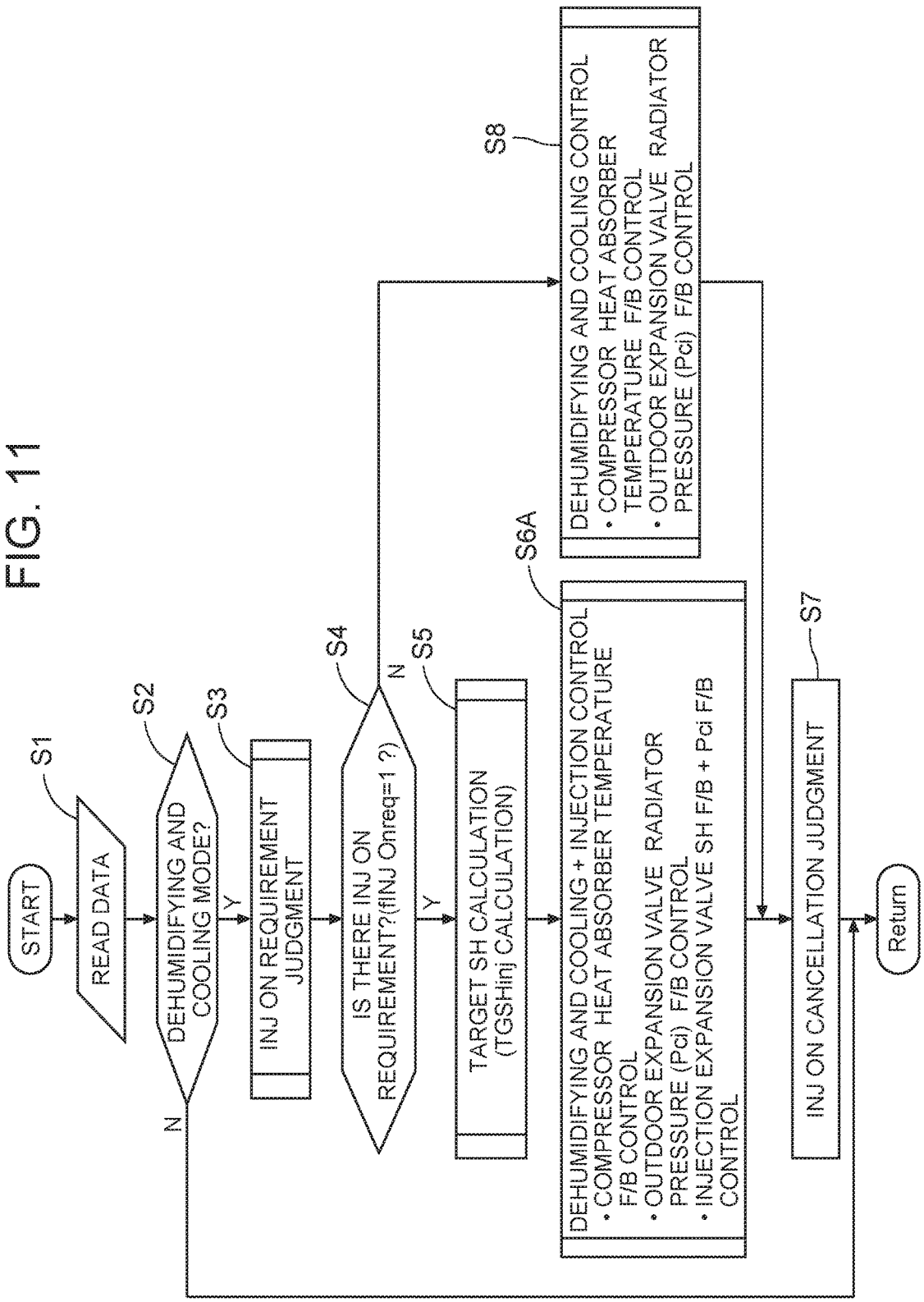
FIG. 11 is a flowchart of still another embodiment to explain the operation of the controller of FIG. 2.
Figure 12:
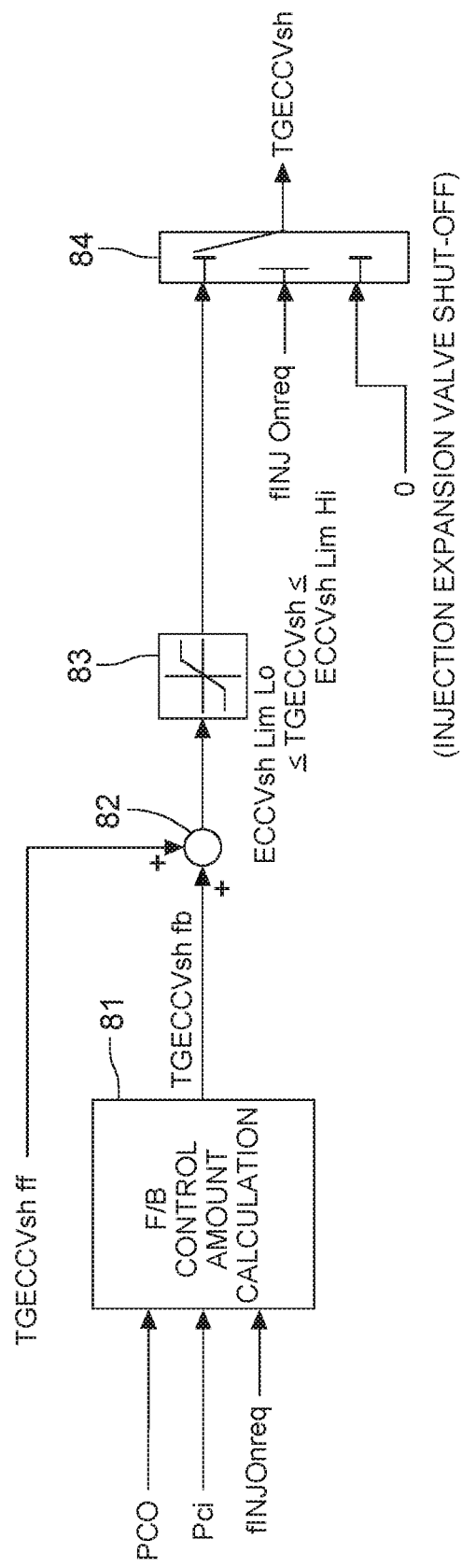
FIG. 12 is a control block diagram of the other embodiment concerning control of an injection expansion valve in the dehumidifying and cooling mode by the controller in the case of FIG. 11.

Next, control of still another embodiment by a controller 32 of the present invention will be described with reference to FIG. 11 and FIG. 12. FIG. 11 is a flowchart to explain an operation of the controller 32 in this case, and FIG. 12 shows a control block of an injection expansion valve 30 for use in the case. It is to be noted that in FIG. 11, steps denoted with the same reference signs as in FIG. 8 are steps to execute similar control.

In this case, the controller 32 similarly executes dehumidifying and cooling in which gas injection is performed in step S6A of FIG. 11 corresponding to the step S6 of FIG. 8, but in this case, control of the injection expansion valve 30 is changed in accordance with conditions.

(12) Control 2 of Injection Expansion Valve in Dehumidifying and Cooling Mode

FIG. 12 is another control block diagram of the controller 32 which determines an injection expansion valve target position TGECCVsh of the injection expansion valve 30 of an injection circuit 40 for the above dehumidifying and cooling mode.

An F/B control amount calculation section 81 in this case calculates an F/B control amount TGECCVshfb of the injection expansion valve target position in this case on the basis of a target radiator pressure PCO and a radiator pressure Pci. Additionally, the F/B control amount calculation section 81 operates when an injection requirement flag fINJOnreq is "1" (set), and stops the calculation when the flag is "0" (reset). Further, the F/B control amount TGECCVshfb calculated by the F/B control amount calculation section 81 and an F/F control amount TGECCVshff of the injection expansion valve 30 in this case which is beforehand determined are added by an adder 82, limits of a controlling upper limit value and a controlling lower limit value are attached by a limit setting section 83, and then the control amount is input into an injection feasibility changing section 84.

Into the injection feasibility changing section 84, "0" (the injection expansion valve 30 is shut off) is further input, and when the injection requirement flag fINJOnreq is "1" (set), the value through the limit setting section 83 is determined as the injection expansion valve target position TGECCVsh in this case, and output. It is to be noted that the injection feasibility changing section 84 outputs "0" as the injection expansion valve target position TGECCVsh, when the injection requirement flag fINJOnreq is "0" (reset).

(13) Gas Injection Control 2 in Dehumidifying and Cooling Mode

Further, in the step S6A of FIG. 11, the controller 32 controls a valve position of the injection expansion valve 30 in the injection expansion valve target position TGECCVsh calculated in the control block of FIG. 7, in a case where an injection refrigerant superheat degree SHinj is a predetermined value or less, and the controller controls the valve position of the injection expansion valve 30 in the injection expansion valve target position TGECCVsh calculated in the control block of FIG. 12 in a case where the degree is higher than the predetermined value.

That is, in this embodiment, when the gas injection is performed in the dehumidifying and cooling mode and in a case where the injection refrigerant superheat degree SHinj is low, the controller 32 determines the injection expansion valve target position TGECCVsh on the basis of the injection refrigerant superheat degree SHinj, and a target injection refrigerant superheat degree TGSHinj, and controls the valve position of the injection expansion valve 30 (FIG. 7), and in a case where the injection refrigerant superheat degree SHinj is high, the controller determines the injection expansion valve target position TGECCVsh on the basis of the target radiator pressure PCO and the radiator pressure Pci and controls the valve position of the injection expansion valve 30 (FIG. 12).

Consequently, in this embodiment, the controller 32 controls the valve position of the injection expansion valve 30 on the basis of the injection refrigerant superheat degree SHinj and the target injection refrigerant superheat degree TGSHinj in the case where the injection refrigerant superheat degree SHinj is low, and the controller controls the valve position of the injection expansion valve 30 on the basis of the target radiator pressure PCO and the radiator pressure Pci in the case where the injection refrigerant superheat degree SHinj is high. Consequently, the radiator pressure Pci in situations where the gas injection amount is small, i.e., the high pressure can be acquired, and the heating capability of the radiator 4 can be maintained.

It is to be noted that the dehumidifying and cooling mode is not limited to the flow of the refrigerant as in the above respective embodiments, and the dehumidifying and cooling may be performed by a parallel circuit in which the refrigerant bypasses the outdoor heat exchanger 7 but is passed through the refrigerant pipe 13F into the heat absorber 9. That is, the present invention is also effective in a case where heat is not radiated in the outdoor heat exchanger 7 and the dehumidifying and cooling are performed only by the heat radiation of the radiator 4 and the heat absorption of the heat absorber 9.

Additionally, the discharge side heat exchanger 35 of the injection circuit 40 is not limited to the above constitution, and the heat exchanger may be disposed on the downstream side of the radiator 4 to perform heat exchange between the refrigerant passed through the radiator 4 and the refrigerant passed through the injection expansion valve 30.

Furthermore, in the embodiments, the present invention is applied to the vehicular air conditioner 1 which changes and executes the respective operation modes of the heating mode, the dehumidifying and heating mode, the dehumidifying and cooling mode and the cooling mode, but the present invention is not limited to the embodiments, and the present invention is also effective for a vehicular air conditioner which only performs the dehumidifying and cooling mode.

Additionally, the constitution or each numeric value of the refrigerant, circuit R described in the above embodiments are not limited to the embodiments, and needless to say, they can be changed without departing from the gist of the present invention.

DESCRIPTION OF REFERENCE NUMERALS 1 vehicular air conditioner
2 compressor
3 air flow passage
4 radiator
6 outdoor expansion valve
7 outdoor heat exchanger
8 indoor expansion valve
9 heat absorber
11 evaporation capability control valve
17, 20, 21 and 22 solenoid valve
26 suction changing damper
27 indoor blower (blower fan)
28 air mix damper
32 controller (control means)
30 injection expansion valve
40 injection circuit
35 discharge side heat exchanger
R refrigerant circuit

The invention claimed is:

1. A vehicular air conditioner comprising:
a compressor which compresses a refrigerant;
a radiator which lets the refrigerant radiate heat to heat air to be supplied to a vehicle interior;
a heat absorber which lets the refrigerant absorb heat to cool the air to be supplied to the vehicle interior;
an outdoor heat exchanger disposed outside of the vehicle interior to let the refrigerant radiate heat; and
control means,
the vehicular air conditioner executing a dehumidifying and cooling mode in which the control means lets the refrigerant discharged from the compressor to radiate heat in the radiator and in the outdoor heat exchanger or only in the radiator, decompresses the refrigerant by which heat has been radiated and then lets the refrigerant absorb heat in the heat absorber,
the vehicular air conditioner comprising:
an injection circuit which distributes a part of the refrigerant flowing out from the radiator to return the part of the refrigerant to the compressor,
wherein in the dehumidifying and cooling mode, the control means operates the injection circuit to return the refrigerant to the compressor, when there is established predetermined radiator capability shortage condition on which a heating capability of the radiator runs short and/or a predetermined low outdoor air temperature startup condition on which startup is performed at the low outdoor air temperature.

2. The vehicular air conditioner according to claim 1,
wherein after the elapse of a predetermined time from the startup, the control means judges that the radiator capability shortage condition is established in a case where a difference between a target radiator temperature and a temperature of the radiator increases and/or a difference between a target radiator pressure and a pressure of the radiator increases.

3. The vehicular air conditioner according to claim 2, comprising:
an outdoor expansion valve which decompresses the refrigerant flowing into the outdoor heat exchanger,
wherein the control means controls a number of revolutions of the compressor on the basis of the target heat absorber temperature of the heat absorber, and controls the valve position of the outdoor expansion valve on the basis of the target radiator pressure of the radiator.

4. The vehicular air conditioner according to claim 2,
wherein the injection circuit has an injection expansion valve, and a heat exchanger which performs heat exchange between the refrigerant decompressed by this injection expansion valve and the refrigerant discharged from the compressor before flowing into the radiator or the refrigerant flowing out from this radiator, and
the control means controls the valve position of the injection expansion valve on the basis of the injection refrigerant superheat degree of the refrigerant to be returned to the compressor by the injection circuit and a predetermined target injection refrigerant superheat degree.

5. The vehicular air conditioner according to claim 2,
wherein the control means stops the operation of the injection circuit when there is established one of, any combination of, or all of: a case where the difference between the target radiator temperature and the temperature of the radiator decreases, a case where the difference between the target radiator pressure and the pressure of the radiator decreases, and a case where a difference between a target heat absorber temperature and a temperature of the heat absorber decreases.

6. The vehicular air conditioner according to claim 5, comprising:
an outdoor expansion valve which decompresses the refrigerant flowing into the outdoor heat exchanger,
wherein the control means controls a number of revolutions of the compressor on the basis of the target heat absorber temperature of the heat absorber, and controls the valve position of the outdoor expansion valve on the basis of the target radiator pressure of the radiator.

7. The vehicular air conditioner according to claim 5,
wherein the injection circuit has an injection expansion valve, and a heat exchanger which performs heat exchange between the refrigerant decompressed by this injection expansion valve and the refrigerant discharged from the compressor before flowing into the radiator or the refrigerant flowing out from this radiator, and
the control means controls the valve position of the injection expansion valve on the basis of the injection refrigerant superheat degree of the refrigerant to be returned to the compressor by the injection circuit and a predetermined target injection refrigerant superheat degree.

8. The vehicular air conditioner according to claim 1,
wherein within a predetermined time from the startup, the control means judges that the low outdoor air temperature startup condition is established in a case where the outdoor air temperature is low and a target outlet temperature to the vehicle interior is high.

9. The vehicular air conditioner according to claim 8, comprising:
an outdoor expansion valve which decompresses the refrigerant flowing into the outdoor heat exchanger,
wherein the control means controls a number of revolutions of the compressor on the basis of the target heat absorber temperature of the heat absorber, and controls the valve position of the outdoor expansion valve on the basis of the target radiator pressure of the radiator.

10. The vehicular air conditioner according to claim 8,
wherein the injection circuit has an injection expansion valve, and a heat exchanger which performs heat exchange between the refrigerant decompressed by this injection expansion valve and the refrigerant discharged from the compressor before flowing into the radiator or the refrigerant flowing out from this radiator, and
the control means controls the valve position of the injection expansion valve on the basis of the injection refrigerant superheat degree of the refrigerant to be returned to the compressor by the injection circuit and a predetermined target injection refrigerant superheat degree.

11. The vehicular air conditioner according to claim 8,
wherein the control means stops the operation of the injection circuit in a case where the outdoor air temperature rises and the target outlet temperature drops.

12. The vehicular air conditioner according to claim 11, comprising:
an outdoor expansion valve which decompresses the refrigerant flowing into the outdoor heat exchanger,
wherein the control means controls a number of revolutions of the compressor on the basis of the target heat absorber temperature of the heat absorber, and controls the valve position of the outdoor expansion valve on the basis of the target radiator pressure of the radiator.

13. The vehicular air conditioner according to claim 11, wherein the injection circuit has an injection expansion valve, and a heat exchanger which performs heat exchange between the refrigerant decompressed by this injection expansion valve and the refrigerant discharged from the compressor before flowing into the radiator or the refrigerant flowing out from this radiator, and the control means controls the valve position of the injection expansion valve on the basis of the injection refrigerant superheat degree of the refrigerant to be returned to the compressor by the injection circuit and a predetermined target injection refrigerant superheat degree.

14. The vehicular air conditioner according to claim 1, comprising:

an outdoor expansion valve which decompresses the refrigerant flowing into the outdoor heat exchanger, wherein the control means controls a number of revolutions of the compressor on the basis of the target heat absorber temperature of the heat absorber, and controls the valve position of the outdoor expansion valve on the basis of the target radiator pressure of the radiator.

15. The vehicular air conditioner according to claim 14, wherein the injection circuit has an injection expansion valve, and a heat exchanger which performs heat exchange between the refrigerant decompressed by this injection expansion valve and the refrigerant discharged from the compressor before flowing into the radiator or the refrigerant flowing out from this radiator, and the control means controls the valve position of the injection expansion valve on the basis of the injection refrigerant superheat degree of the refrigerant to be returned to the compressor by the injection circuit and a predetermined target injection refrigerant superheat degree.

16. The vehicular air conditioner according to claim 1, wherein the injection circuit has an injection expansion valve, and a heat exchanger which performs heat exchange between the refrigerant decompressed by this injection expansion valve and the refrigerant discharged from the compressor before flowing into the radiator or the refrigerant flowing out from this radiator, and the control means controls the valve position of the injection expansion valve on the basis of the injection refrigerant superheat degree of the refrigerant to be returned to the compressor by the injection circuit and a predetermined target injection refrigerant superheat degree.

17. The vehicular air conditioner according to claim 16, wherein in a case where the radiator capability shortage condition is established, the control means increases the target injection refrigerant superheat degree when the difference between the target radiator temperature and the temperature of the radiator is small and/or when the difference between the target radiator pressure and the pressure of the radiator is small, and the control means decreases the target injection refrigerant superheat degree when the difference between the target radiator temperature and the temperature of the radiator is large and/or when the difference between the target radiator pressure and the pressure of the radiator is large.

18. The vehicular air conditioner according to claim 17, wherein the control means controls the valve position of the injection expansion valve on the basis of the injection refrigerant superheat degree and the target injection refrigerant superheat degree in a case where the injection refrigerant superheat degree is low, and the control means controls the valve position of the injection expansion valve on the basis of the target radiator pressure and the pressure of the radiator in a case where the injection refrigerant superheat degree is high.

19. The vehicular air conditioner according to claim 16, wherein the control means controls the valve position of the injection expansion valve on the basis of the injection refrigerant superheat degree and the target injection refrigerant superheat degree in a case where the injection refrigerant superheat degree is low, and the control means controls the valve position of the injection expansion valve on the basis of the target radiator pressure and the pressure of the radiator in a case where the injection refrigerant superheat degree is high.

* * * * *